(12) United States Patent
Fujiki

(10) Patent No.: US 10,942,427 B2
(45) Date of Patent: Mar. 9, 2021

(54) LENS UNIT AND CAMERA SYSTEM

(71) Applicant: FUJIFILM Corporation, Tokyo (JP)

(72) Inventor: Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/783,928

(22) Filed: Feb. 6, 2020

(65) Prior Publication Data

US 2020/0174346 A1 Jun. 4, 2020

Related U.S. Application Data

(63) Continuation of application No. PCT/JP2018/020306, filed on May 28, 2018.

(30) Foreign Application Priority Data

Aug. 14, 2017 (JP) .............................. JP2017-156576

(51) Int. Cl.
*G03B 17/18* (2021.01)
*G02B 7/02* (2021.01)
(Continued)

(52) U.S. Cl.
CPC ............. *G03B 17/18* (2013.01); *G02B 7/021* (2013.01); *G02B 7/026* (2013.01); *G03B 17/14* (2013.01); *H04N 5/2254* (2013.01)

(58) Field of Classification Search
CPC .... G02B 13/00; G02B 13/0015; G02B 23/24; G02B 23/2415; G02B 23/2476;
(Continued)

(56) References Cited

U.S. PATENT DOCUMENTS 5,761,554 A * 6/1998 Kirigaya ................ G03B 17/18
396/299
2013/0021686 A1 1/2013 Uehara
(Continued)

FOREIGN PATENT DOCUMENTS

CN 1061466 A 5/1992
CN 201568351 U 9/2010
(Continued)

OTHER PUBLICATIONS

International Search Report for PCT/JP2018/020306 (PCT/ISA/210) dated Aug. 28, 2018.
(Continued)

*Primary Examiner* — Brandi N Thomas
(74) *Attorney, Agent, or Firm* — Birch, Stewart, Kolasch & Birch, LLP

(57) ABSTRACT

Provided are a lens unit and a camera system capable of reducing an amount of rotation of a stop ring in a case of switching between a manual exposure mode and an auto exposure mode.
The lens unit 200 includes an optical system 202 that includes at least one lens, a lens barrel 204 that houses the optical system, and a stop ring 208 that is rotatably disposed around the optical axis OA as an axis. The stop ring 208 includes a first indication area 218 and a second indication area 220. The first indication area 218 and the second indication area 220 respectively includes auto indications 218A and 220A corresponding to the auto exposure mode and exposure amount indications 218B and 220B corresponding to the manual exposure mode. The first indication area 218 and the second indication area 220 have periodicity.

11 Claims, 24 Drawing Sheets

(51) Int. Cl.
*G03B 17/14* (2021.01)
*H04N 5/225* (2006.01)

(58) Field of Classification Search
CPC ... G02B 7/04; G02B 7/08; G02B 7/02; G02B 7/10; G02B 7/105; G02B 7/34; G02B 15/14; G02B 7/102; G02B 7/14; G02B 13/009; G02B 13/04; G02B 13/146; G02B 13/18; G02B 15/15; G02B 15/163; G02B 15/177; G02B 15/20; G02B 27/0025; G02B 27/0093; G02B 27/1006; G02B 5/005; G02B 7/36; G02B 17/00; G02B 23/12; G02B 27/32; G02B 7/022; G02B 7/28; G02B 7/30; H04N 5/2254; H04N 5/23248; H04N 5/23258; H04N 5/23287; H04N 5/23293; H04N 5/232939; G03B 17/18; G03B 17/14; G03B 17/20; G03B 2205/0015; G03B 2217/005; G03B 2217/185; G03B 5/00; G03B 7/097; G03B 2217/002
USPC .................. 359/811, 813, 815, 819–824
See application file for complete search history.

(56) References Cited

U.S. PATENT DOCUMENTS

| | | |
|---|---|---|
| 2013/0163975 A1 | 6/2013 | Toyama et al. |
| 2015/0138437 A1 | 5/2015 | Matsuura et al. |
| 2016/0316139 A1 | 10/2016 | Arai |
| 2018/0203202 A1 | 7/2018 | Takeshita et al. |
| 2018/0203329 A1* | 7/2018 | Takeshita ............... G02B 7/14 |
| 2018/0224712 A1 | 8/2018 | Tominaga et al. |

FOREIGN PATENT DOCUMENTS

| | | |
|---|---|---|
| CN | 102890327 A | 1/2013 |
| CN | 103048850 A | 4/2013 |
| CN | 103080805 A | 5/2013 |
| CN | 104471459 A | 3/2015 |
| CN | 105960795 A | 9/2016 |
| CN | 205608351 U | 9/2016 |
| JP | 2005-215520 A | 8/2005 |
| WO | WO 2016/039294 A1 | 3/2016 |
| WO | WO 2017/047592 A1 | 3/2017 |
| WO | WO 2017/047593 A1 | 3/2017 |

OTHER PUBLICATIONS

Written Opinion of the International Searching Authority for PCT/JP2018/020306 (PCT/ISA/237) dated Aug. 28, 2018.

International Preliminary Report on Patentability and English translation of the Written Opinion (Forms PCT/IB/373, PCT/IB/326, and PCT/ISA/237) for International Application No. PCT/JP2018/020306, dated Feb. 18, 2020.

Chinese Office Action and Search Report for corresponding Chinese Application No. 201880052412.6, dated Jun. 30, 2020, with an English translation.

Chinese Office Action dated Sep. 27, 2020 for counterpart Application No. 201880052412.6 with an English translation.

* cited by examiner

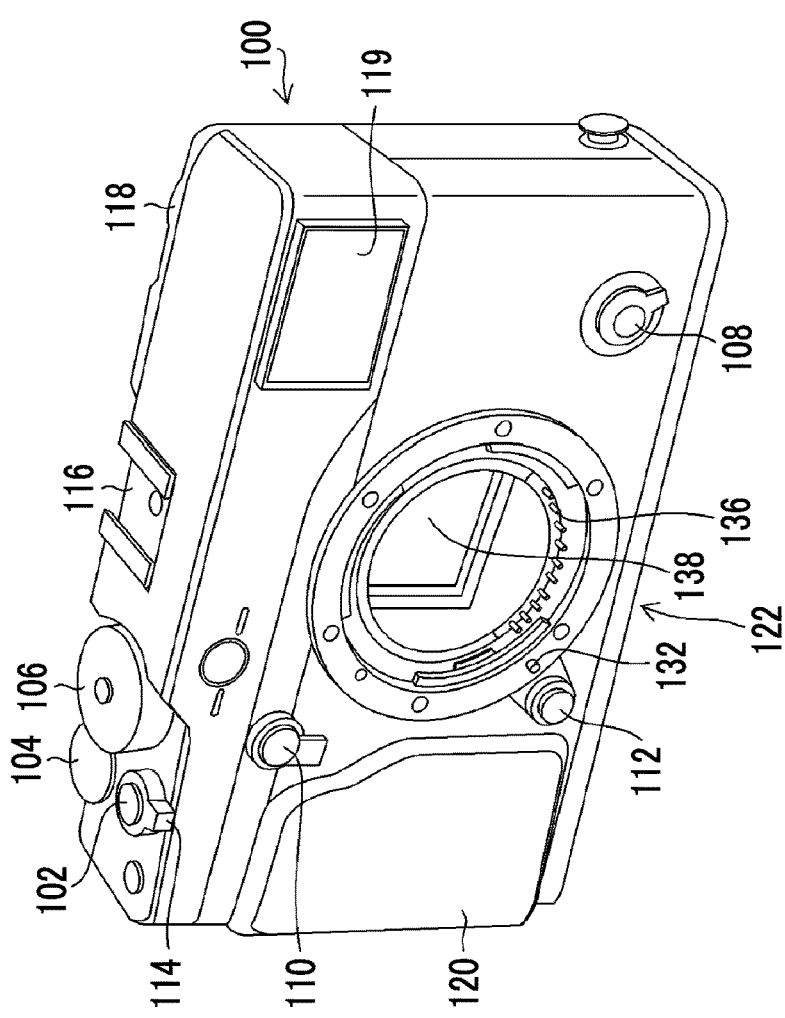
FIG. 2
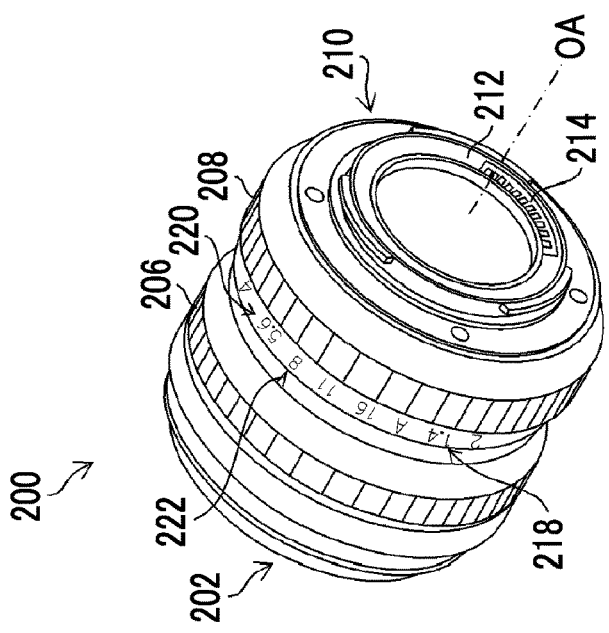

FIG. 7

| POSITION NUMBER | ROTATIONAL POSITION | CIRCUIT WIRING | | | | | | OUTPUT SIGNAL |
|---|---|---|---|---|---|---|---|---|
| | | C6 | C5 | C4 | C3 | C2 | C1 | |
| 0 | A | 1 | 1 | 1 | 1 | 1 | 0 | 111110 |
| 22 | 16 | 1 | 1 | 1 | 1 | 0 | 0 | 111100 |
| 21 | 14 | 1 | 1 | 0 | 1 | 0 | 0 | 110100 |
| 20 | 13 | 1 | 1 | 0 | 1 | 1 | 0 | 110110 |
| 19 | 11 | 1 | 1 | 0 | 1 | 1 | 1 | 110111 |
| 18 | 10 | 1 | 1 | 0 | 1 | 0 | 1 | 110101 |
| 17 | 9 | 1 | 1 | 1 | 1 | 0 | 1 | 111101 |
| 16 | 8 | 1 | 1 | 1 | 0 | 0 | 1 | 111001 |
| 15 | 7.1 | 1 | 1 | 0 | 0 | 0 | 1 | 110001 |
| 14 | 6.3 | 1 | 1 | 0 | 0 | 1 | 1 | 110011 |
| 13 | 5.6 | 1 | 1 | 0 | 0 | 1 | 0 | 110010 |
| 12 | 5 | 1 | 1 | 1 | 0 | 1 | 0 | 111010 |
| 11 | 4.5 | 1 | 0 | 1 | 0 | 1 | 0 | 101010 |
| 10 | 4 | 1 | 0 | 1 | 1 | 1 | 0 | 101110 |
| 9 | 3.5 | 1 | 0 | 1 | 1 | 0 | 0 | 101100 |
| 8 | 3.2 | 1 | 0 | 1 | 1 | 0 | 1 | 101101 |
| 7 | 2.8 | 1 | 0 | 1 | 1 | 1 | 1 | 101111 |
| 6 | 2.5 | 1 | 0 | 1 | 0 | 1 | 1 | 101011 |
| 5 | 2.2 | 1 | 1 | 1 | 0 | 1 | 1 | 111011 |
| 4 | 2 | 0 | 1 | 1 | 0 | 1 | 1 | 011011 |
| 3 | 1.8 | 0 | 1 | 1 | 0 | 1 | 0 | 011010 |
| 2 | 1.6 | 0 | 1 | 1 | 1 | 1 | 0 | 011110 |
| 1 | 1.4 | 0 | 1 | 1 | 1 | 0 | 0 | 011100 |

LENS UNIT AND CAMERA SYSTEM

CROSS-REFERENCE TO RELATED APPLICATIONS

The present application is a Continuation of PCT International Application No. PCT/JP2018/020306 filed on May 28, 2018 claiming priorities under 35 U.S.C. § 119(a) to Japanese Patent Application No. 2017-156576 filed on Aug. 14, 2017. Each of the above applications is hereby expressly incorporated by reference, in its entirety, into the present application.

BACKGROUND OF THE INVENTION

1. Field of the Invention

The present invention relates to a lens unit having a stop ring, which switches between a manual exposure mode and an auto exposure mode, and a camera system.

2. Description of the Related Art

As a lens unit mounted on a camera body such as a single-lens reflex digital camera, a lens unit having a stop ring for adjusting an exposure amount is known. For example, JP2005-215520A discloses that a user switches between a manual exposure mode in which an exposure amount is manually adjusted and an auto exposure mode in which the exposure amount is automatically adjusted by a stop ring.

SUMMARY OF THE INVENTION

However, in JP2005-215520A, in a case of switching from indication of "A" in the auto exposure mode to indication of an open F number of "2" in the manual exposure mode, it is necessary for a user to rotate the stop ring by a large amount.

The present invention has been made in view of such situations, and an object thereof is to provide a lens unit and a camera system capable of reducing the amount of rotation of the stop ring in a case of switching between a manual exposure mode and an auto exposure mode.

According to a first aspect, there is provided a lens unit comprising: an optical system that includes at least one lens; a lens barrel that houses the optical system; and a stop ring that is disposed on an outer peripheral surface of the lens barrel so as to be rotatable around an axis. The stop ring includes a plurality of indication areas, each of the indication areas includes an auto indication corresponding to an auto exposure mode and exposure amount indications corresponding to a manual exposure mode, and the plurality of indication areas have periodicity.

In the lens unit of a second aspect, it is preferable that in each of the indication areas, a minimum exposure amount indication of the exposure amount indications and the auto indication are adjacent to each other.

In the lens unit of a third aspect, it is preferable that in each of the indication areas, a maximum exposure amount indication of the exposure amount indications and the auto indication are adjacent to each other.

In the lens unit of a fourth aspect, it is preferable that the exposure amount indications of the plurality of indication areas are F numbers.

In the lens unit of a fifth aspect, it is preferable that the exposure amount indications of one of the plurality of indication areas are F numbers, and the other exposure amount indications are different indications correlated with the F numbers.

In the lens unit according to a sixth aspect, it is preferable that the different indications include any of T values, AV values, and difference values from an open F number In the lens unit according to a seventh aspect, it is preferable that the stop ring includes an additional auto indication corresponding to the auto exposure mode, in addition to the plurality of indication areas.

In the lens unit of an eighth aspect, it is preferable that a sum of central angles of the indication areas with respect to the axis is 360°.

In the lens unit of a ninth aspect, it is preferable that the stop ring rotates endlessly around the outer peripheral surface of the lens barrel.

In the lens unit of a tenth aspect, it is preferable that depending on a rotational position of the stop ring, any one of the plurality of exposure amount indications and the auto indication is selected by a code plate, which is fixed to the outer periphery of the lens barrel and forms a pattern by a combination of a conductive portion and a non-conductive portion, and a plurality of electrical contact points which respectively correspond to the plurality of indication areas and of which positions of contact with the code plate are changed in accordance with rotation of the stop ring.

According to an eleventh aspect, there is provided a camera system comprising: the above-mentioned lens unit; and a camera body on which the lens unit can be interchangeably mounted.

According to the present invention, the amount of rotation of the stop ring in a case of switching between the manual exposure mode and the auto exposure mode can be reduced.

BRIEF DESCRIPTION OF THE DRAWINGS

FIG. 2 is an external perspective view of a lens unit and a camera body.

FIG. 7 is an explanatory diagram for explaining a detection signal acquired from an electrical contact point and a code plate.

DESCRIPTION OF THE PREFERRED EMBODIMENTS

Hereinafter, preferred embodiments of the present invention will be described with reference to the accompanying drawings. The present invention will be described through the following preferred embodiments.

Various modifications can be made by various techniques without departing from the scope of the present invention, and other embodiments than the above embodiments can be applied. Accordingly, all modifications within the scope of the present invention are included in the claims.

Figure 1:
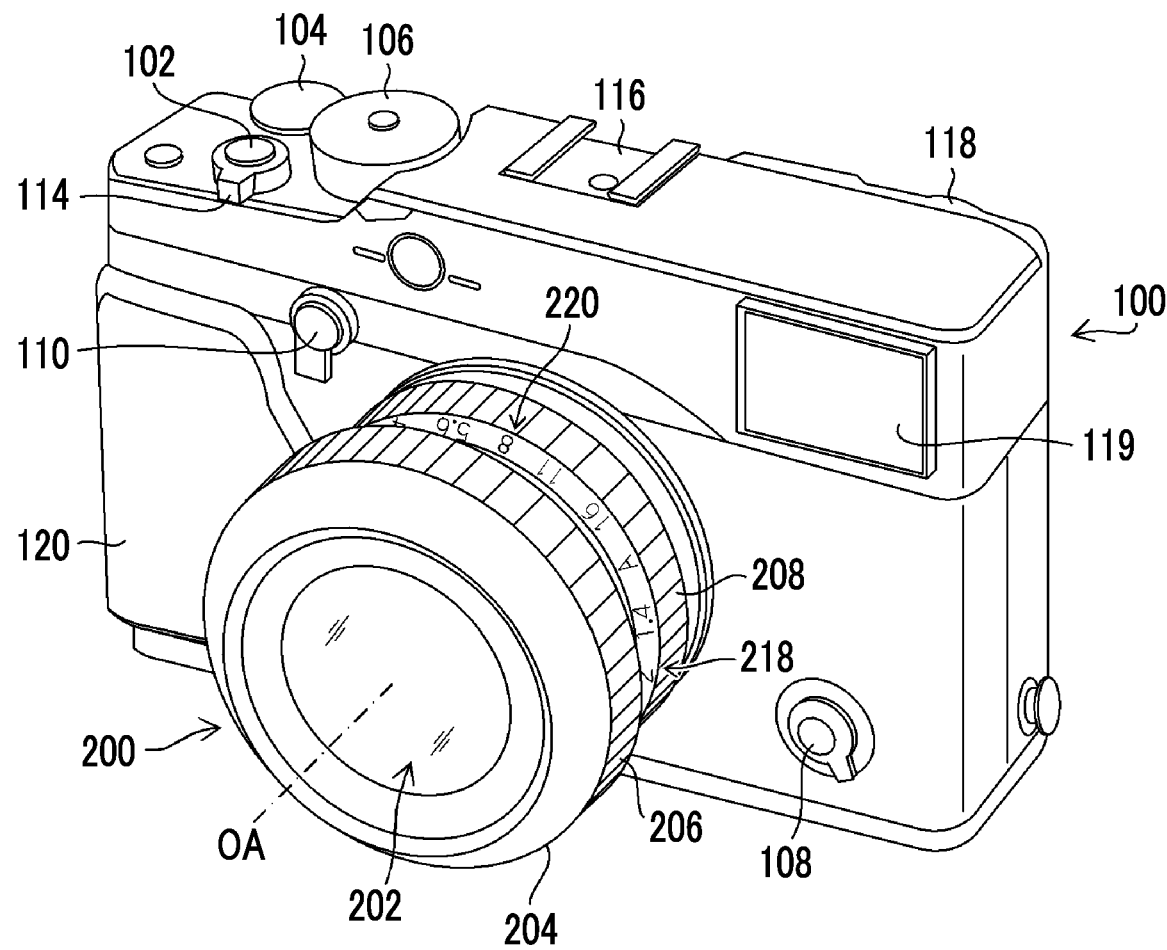
FIG. 1 is an external perspective view of a camera system.

A camera system according to an embodiment will be described with reference to the drawings. FIG. 1 is an external perspective view of a camera unit in which a lens unit and a camera body are mounted. FIG. 2 is an external perspective view of the lens unit and the camera body.

In this specification, the direction along the optical axis OA (the Z direction in FIG. 1) is the front-rear direction, and a direction toward the subject side is the front direction. Further, in a plane orthogonal to the optical axis OA, a direction (the X direction in FIG. 1) along the long side of an image sensor 138 (refer to FIG. 2) is a horizontal direction or a right-left direction, and a direction (the Y direction in FIG. 1) along the short side of the image sensor 138 is a vertical direction or an up-down direction.

As shown in FIG. 1, the camera system 1 includes a camera body 100 and a lens unit 200. The camera system 1 of the embodiment is an interchangeable lens type camera system 1, and the lens unit 200 is attachably and detachably mounted on the camera body 100 so as to be replaceable.

As shown in FIGS. 1 and 2, the camera body 100 has a rectangular box shape of which the thickness in the front-rear direction is smaller than the height thereof in the up-down direction. As shown in FIG. 1, the camera body 100 comprises, as operation members, a release switch 102, an exposure compensation dial 104, a shutter speed dial 106, a focus mode switching lever 108, a viewfinder switching lever 110, a power lever 114, and the like. The release switch 102, the exposure compensation dial 104, and the shutter speed dial 106 are arranged on the upper side of the camera body 100.

The release switch 102 is a two-stage stroke type switch that is capable of so-called "half pressing" and "full pressing". The release switch 102 outputs an S1-on signal through half pressing, and outputs an S2-on signal through full pressing which is more pressed than half pressing. The camera system 1 performs imaging preparation processing such as auto focus adjustment control (AF processing) or auto exposure control in a case where the S1-on signal is output from the release switch 102, and performs imaging processing in a case where the S2-on signal is output.

The camera body 100 comprises a hot shoe 116, an electronic viewfinder 118, an optical viewfinder window 119, and a grip 120. The grip 120 is disposed on the left side of the camera body 100. A user holds the grip 120 and performs a release operation through the release switch 102.

As shown in FIG. 2, the camera body 100 comprises a lens attachment/detachment button 112 and a body mount 122. As shown in FIG. 2, the body mount 122 is a mount portion for mounting the lens unit 200. The body mount 122 has a bayonet structure.

The body mount 122 is provided with a plurality of body signal contact points 136 along the inner periphery of the opening in order to be electrically connected to the lens unit 200. The body signal contact points 136 are composed of, for example, pins and are biased to the front side of the camera body 100 by biasing means (not shown).

As shown in FIG. 2, an image sensor 138 exposed from the opening of the body mount 122 is disposed in the camera body 100. The image sensor 138 converts an object image formed through the lens unit 200 into an electric signal and outputs the electric signal. As the image sensor 138, a known image sensor such as a CCD image sensor (CCD: Charged Coupled Device) or a CMOS image sensor (CMOS: Complementary Metal Oxide Semiconductor) is used.

A lock pin 132 is disposed on the body mount 122. The lock pin 132 is biased forward by the biasing means (not shown). In conjunction with the pressing operation of the lens attachment/detachment button 112, the lock pin 132 can be retracted backward.

As shown in FIGS. 1 and 2, the lens unit 200 of the embodiment includes an optical system 202 including at least one lens, a lens barrel 204 that houses the optical system 202, a focus ring 206, and a stop ring 208, and a lens mount 210. The optical system 202 including a lens means an assembly of optical members for forming an image of an object by transmitting light through the lens. The lens barrel 204 is a substantially cylindrical tubular body that is able to house the optical system 202, and the shape thereof is not limited as long as the optical system 202 can be housed.

The lens mount 210 is provided on one end side of the lens barrel 204 of the lens unit 200, that is, on the rear side of the lens barrel 204. The lens mount 210 has a bayonet structure, and is attachably and detachably mounted on the body mount 122 having the bayonet structure.

As shown in FIG. 2, the lens mount 210 comprises a mount cover 212. A plurality of lens signal contact points 214 are arranged on the mount cover 212 for electrical connection with the camera body 100.

The stop ring 208 of the lens unit 200 has an annular shape, and is disposed on the outer peripheral surface of the lens barrel 204 so as to be rotatable around the optical axis OA as the axis. The stop ring 208 is an operation member for the user to manually rotate and control the stop. The stop ring 208 comprises a first indication area 218 and a second indication area 220 that compose a plurality of indication areas on the peripheral surface thereof. The lens barrel 204 comprises an index 222. In order to align the indication of either the first indication area 218 or the second indication area 220 with the index 222, the stop ring 208 is rotated.

Figure 3:
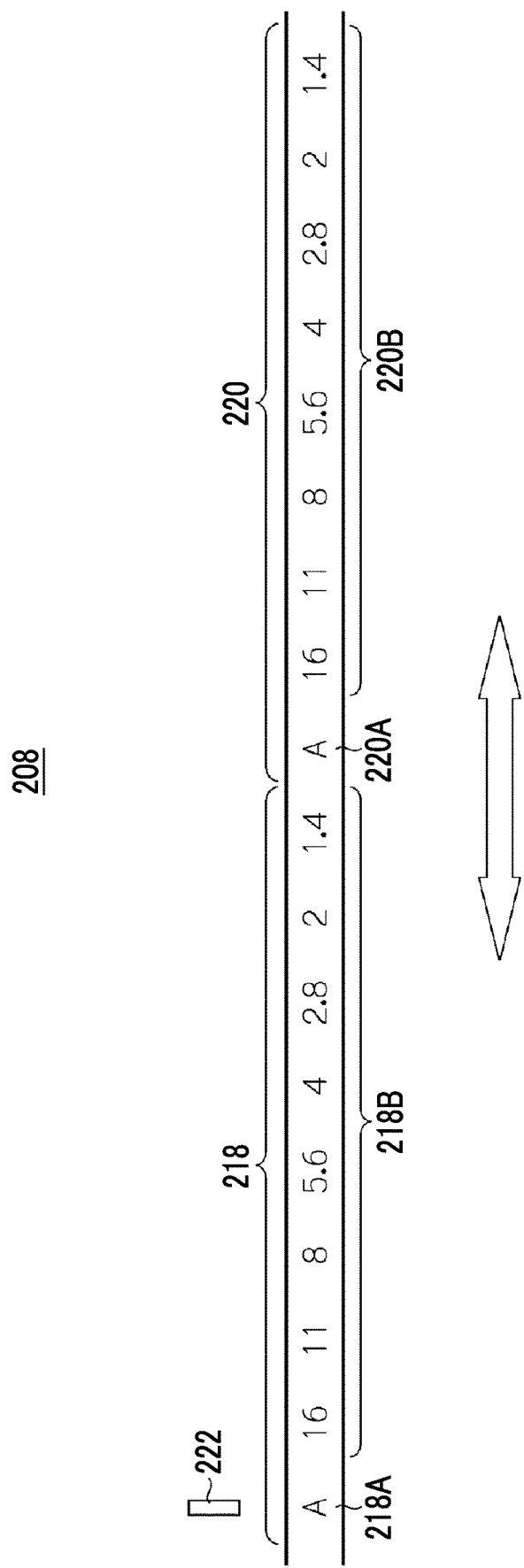
FIG. 3 is a development view of a plurality of indication areas of a stop ring.

FIG. 3 is a development view in which only the first indication area 218 and the second indication area 220 provided in the stop ring 208 are developed on a plane.

As shown in FIG. 3, the first indication area 218 comprises an auto indication 218A corresponding to the auto exposure mode and exposure amount indications 218B corresponding to the manual exposure mode. In the auto indication 218A, "A" is indicated. In a case where "A" which is the auto indication 218A is selected by the stop ring 208, that is, in a case where the auto indication 218A and the index 222 are aligned, the AE processing in the auto exposure mode can be set.

In the embodiment, in the exposure amount indications 218B corresponding to the manual exposure mode, "16, 11, 8, 5.6, 4, 2.8, 2, and 1.4", which are a plurality of F numbers (aperture values), are sequentially arranged. In a case where a certain F number of the exposure amount indications 218B is selected by the stop ring 208, that is, in a case where a certain indication of the exposure amount indications 218B and the index 222 are aligned, the F number can be selectively set.

The second indication area 220 comprises an auto indication 220A corresponding to the auto exposure mode and exposure amount indications 220B corresponding to the manual exposure mode. In the auto indication 220A, "A" is indicated. In a case where "A" which is the auto indication 220A is selected by the stop ring 208, that is, in a case where the auto indication 220A and the index 222 are aligned, the AE processing in the auto exposure mode can be set.

In the embodiment, in the exposure amount indications 220B corresponding to the manual exposure mode, "16, 11, 8, 5.6, 4, 2.8, 2, and 1.4", which are a plurality of F numbers, are sequentially arranged. In a case where a certain F number of the exposure amount indications 220B is selected by the stop ring 208, that is, in a case where a certain indication of the exposure amount indications 220B and the index 222 are aligned, the F number can be selectively set.

Further, the stop ring 208 is adjusted to a predetermined position (a certain position obtained by dividing the interval into three equal parts) between two adjacent F numbers of the exposure amount indications 218B. Therefore, the F number can be set selectively in ⅓ step increments.

As shown in FIG. 3, the first indication area 218 and the second indication area 220 have periodicity. Here, the phrase "the first indication area 218 and the second indication area 220, which are a plurality of indication areas, have periodicity" means that the same characters, numbers, and the like included in the first indication area 218 and the second indication area 220 can be periodically repeated and aligned with the index 222 within the rotation range of the stop ring 208. In addition, regarding the exposure amount indications 218B and the exposure amount indications 220B, a predetermined position (such as the ⅓ step) between the F numbers, which is not indicated on the stop ring 208, also has periodicity.

Regarding the periodicity of the first indication area 218 and the second indication area 220 is, for example, as shown in FIG. 3, an F number of "11" included in the exposure amount indications 218B and an F number of "11" included in the exposure amount indications 220B can be aligned with the index 222 by rotating the stop ring 208 in the directions indicated by the arrows.

Therefore, either the AE processing corresponding to the auto indications 218A and 220A or the exposure amount corresponding to the exposure amount indications 218B and 220B is selected depending on the rotational position of the stop ring 208.

As shown in FIG. 3, in the embodiment, the first indication area 218 and the second indication area 220 provided in the stop ring 208 have periodicity. The F numbers are indicated as the exposure amount indications 218B and the exposure amount indications 220B. In the first indication area 218, "16", which is the minimum exposure amount indication of the plurality of exposure amount indications 218B, is adjacent to the auto indication 218A. On the other hand, "1.4", which is the maximum exposure amount indication (also referred to as an open F number) of the plurality of exposure amount indications 218B, is farthest from the auto indication 218A.

Similarly, in the second indication area 220, "16", which is the minimum exposure amount indication of the plurality of exposure amount indications 220B, is adjacent to the auto indication 220A. On the other hand, "1.4", which is the maximum exposure amount indication of the plurality of exposure amount indications 220B, is farthest from the auto indication 220A.

In the embodiment, for example, in a case where the auto indication 220A is aligned with the index 222 such that the auto exposure mode is set, the stop ring 208 can be moved from the auto indication 220A to "1.4", which is the maximum exposure amount indication of the exposure amount indications 218B, by a small amount of rotation.

As shown in FIG. 3, the embodiment shows the case where "A" of the auto indication is adjacent to "16", which is the minimum exposure amount indication of the exposure amount indications, in each indication area of the first indication area 218 and the second indication area 220. The embodiment is not limited to this, and may be another embodiment in which "A" of the auto indication is adjacent to "1.4", which is the maximum exposure amount indication of the exposure amount indications, in each indication area of the first indication area 218 and the second indication area 220. In the case of another embodiment, in a case where the auto indication 220A is positioned at the index 222 such that the auto exposure mode is set, the stop ring 208 an be moved from the auto indication 220A to "16", which is the minimum exposure amount indication of the exposure amount indications 218B, by a small amount of rotation.

Figure 4:
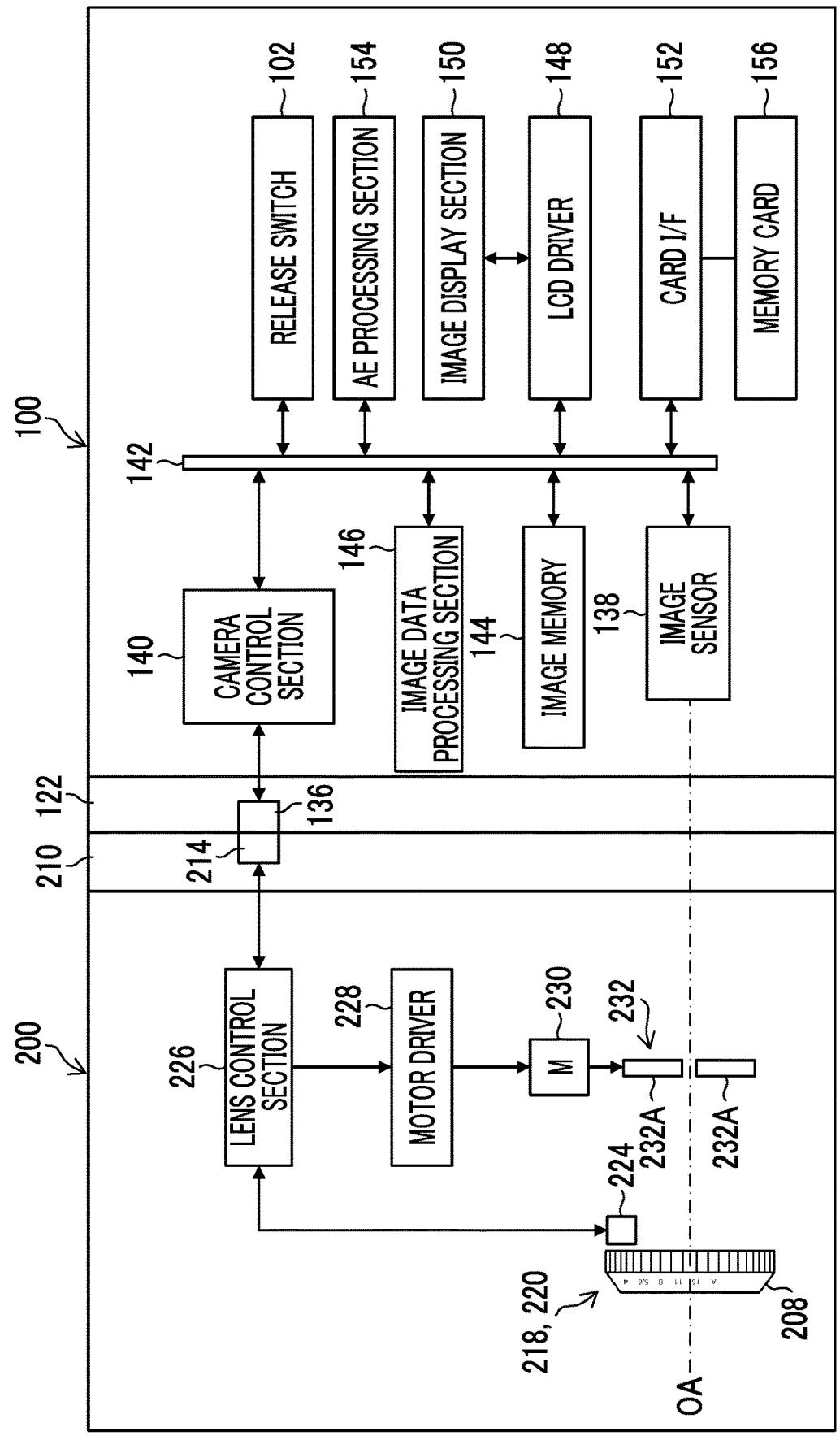
FIG. 4 is a block diagram showing a configuration of the camera system.

FIG. 4 is a block diagram showing a configuration of the camera system 1. As shown in FIG. 4, the lens unit 200 comprises a stop ring 208, a lens mount 210, lens signal contact points 214, a position sensor 224, a lens control section 226, a motor driver 228, a motor 230, an stop unit 232, and the like.

The lens control section 226 includes a micro computer comprising a central processing unit (CPU), a read only memory (ROM) which stores parameters and programs used in the CPU, a random access memory (RAM) which is used as a work memory for the CPU, and the like (any of those is not shown in the drawing). The lens control section 226 controls the sections of the lens unit 200. The position sensor 224 and the motor driver 228 are connected to the lens control section 226.

The lens control section 226 functions as a stop control section that controls the stop diameter of the stop unit 232 and a rotational position detection section that detects a rotational position of the stop ring 208 by obtaining a signal from the position sensor 224, on the basis of a control signal from the camera control section 140. Information about the rotational position of the stop ring 208 detected by the lens control section 226 is input to the camera control section 140 of the camera body 100 through the lens signal contact points 214 and the body signal contact points 136.

The stop unit 232 has a plurality of stop leaf blades 232A. By driving the motor 230, the plurality of stop leaf blades 232A are moved, and the amount of light incident on the image sensor 138 is adjusted. The motor driver 228 controls the driving of the motor 230 on the basis of the control of the lens control section 226.

The position sensor 224 is a position sensor for detecting the rotational position of the stop ring 208. A detection signal from the position sensor 224 is input to the lens control section 226. The lens control section 226 detects the rotational position of the stop ring 208 on the basis of the detection signal input from the position sensor 224. Either AE processing or the exposure amount is selected on the basis of the rotational position of the stop ring 208.

As shown in FIG. 4, the camera body 100 comprises a release switch 102, a body mount 122, body signal contact points 136, an image sensor 138, a camera control section 140, a bus line 142, an image memory 144, an image data processing section 146, an LCD driver 148, an image display section 150, a card interface (I/F) 152, an AE processing section 154, and the like.

The camera control section 140 comprises a CPU, a ROM that stores programs and parameters used by the CPU, a RAM (any of those is not shown in the drawing) used as a work memory for the CPU, and the like. The camera control section 140 controls the sections of the camera body 100 and the lens unit 200 mounted on the camera body 100. The camera control section 140 receives the S1 signal and the S2 signal from the release switch 102. The camera control section 140 is electrically connected to the body signal contact points 136.

The image sensor 138 comprises a denoising circuit, an auto gain controller, and a signal processing circuit such as an analog/digital (A/D) conversion circuit (any of those is not shown in the drawing). The denoising circuit performs denoising processing on the imaging signal. The auto gain controller amplifies a level of the imaging signal to an optimum value. The A/D conversion circuit converts the imaging signal into a digital signal and outputs the digital signal from the image sensor 138 to the bus line 142. The output signal of the image sensor 138 is image data having one color signal for each pixel, so-called RAW data.

The image memory 144 stores image data for one frame which is output to the bus line 142. The image data processing section 146 reads image data for one frame from the image memory 144 and performs known image processing such as matrix calculation, demosaic processing, γ correction, luminance/color difference conversion, and resizing processing.

The LCD driver 148 sequentially inputs image data for one frame processed by the image data processing section 146 to the image display section 150. The image display section 150 sequentially displays live view images with a constant period. The card I/F 152 is incorporated in a card slot (not shown) provided in the camera body 100. The card I/F 152 is electrically connected to the memory card 156 inserted into the card slot. The card I/F 152 stores the image data processed by the image data processing section 146 in the memory card 156. In a case where the image data stored in the memory card 156 is reproduced and displayed, the card I/F 152 reads the image data from the memory card 156.

The camera control section 140 transmits a control signal for operating the stop unit 232 to the lens control section 226 in accordance with the rotational position of the stop ring 208.

In a case where the rotational position of the stop ring 208 is the auto indication 218A or the auto indication 220A, the AE processing is executed. The AE processing section 154 calculates an integrated value of the color signals from the image data for one frame. The camera control section 140 calculates an exposure value on the basis of the integrated value calculated for each image for one frame, and determines a shutter speed and an exposure amount from the exposure value in accordance with a predetermined program diagram. Then, the camera control section 140 controls driving of a shutter motor (not shown) such that the determined shutter speed is obtained, and transmits a control signal to the lens control section 226. The lens control section 226 controls the motor driver 228 on the basis of the control signal so as to operate the stop unit 232. The stop unit 232 is changed to have a stop diameter for obtaining the determined exposure amount.

In a case where the rotational position of the stop ring 208 is the exposure amount indication 218B or the exposure amount indication 218B, the camera control section 140 transmits a control signal to the lens control section 226. The lens control section 226 controls the motor driver 228 on the basis of the control signal, such that the stop unit 232 is changed to have a stop diameter at which an exposure amount corresponding to the rotational position of the stop ring 208 is obtained.

As shown in FIG. 3, either the first indication area 218 (auto indication 218A and exposure amount indications 218B) or the second indication area 220 (auto indication 220A and exposure amount indications 220B) is aligned with the index 222. Then, an exposure amount corresponding to the rotational position of the stop ring 208 can be obtained.

Next, the position sensor 224 for detecting the rotational position of the stop ring 208 having the first indication area 218 and the second indication area 220 shown in FIG. 4 will be described with reference to FIGS. 5, 6, 7, and 8.

Figure 5:
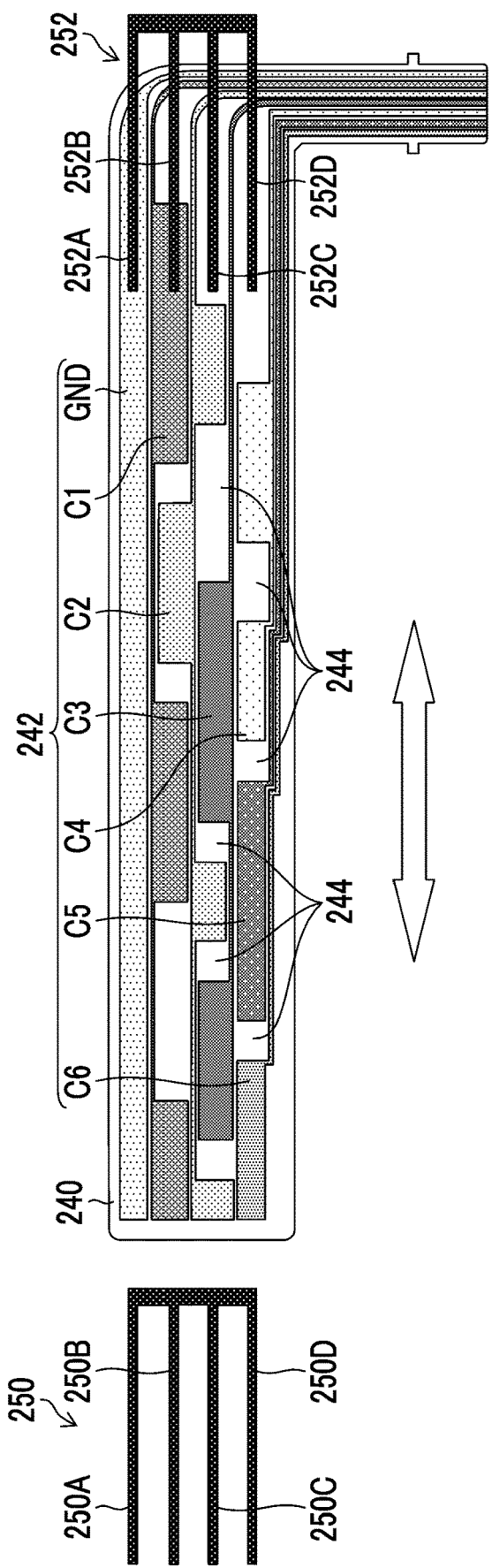
FIG. 5 is a schematic configuration diagram of a position sensor.

FIG. 5 is a schematic configuration diagram of the position sensor 224. The position sensor 224 includes a code plate 240, and a first electrical contact point 250 and a second electrical contact point 252 that are a plurality of electrical contact points through which the position of contact with the code plate 240 is changed in accordance with the rotation of the stop ring 208. The first electrical contact point 250 corresponds to the first indication area 218, and the second electrical contact point 252 corresponds to the second indication area 220. The first electrical contact point 250 and the second electrical contact point 252 are respectively provided for the first indication area 218 and the second indication area 220.

On the basis of the position of contact between the first electrical contact point 250 and the code plate 240, it is detected whether the rotational position of the stop ring 208 is a position of the auto indication 218A or a position of the exposure amount indication 218B in the first indication area 218. Further, on the basis of the position of contact between the second electrical contact point 252 and the code plate 240, it is detected whether the rotational position of the stop ring 208 is a position of the auto indication 220A or a position of the exposure amount indication 220B in the second indication area 220. Therefore, the code plate 240 is in electrical contact with only one of the first electrical contact point 250 and the second electrical contact point 252.

The code plate 240 is fixed to the outer peripheral surface of the lens barrel 204 (not shown in the drawing). The code plate 240 does not follow the rotation of the stop ring 208. In the embodiment, the code plate 240 has a conductive portion 242 composed of seven circuit wirings GND, C1, C2, C3, C4, C5, and C6, and a non-conductive portion 244 in which the circuit wirings GND, C1, C2, C3, C4, C5, and C6 are not arranged.

A ground potential as a reference is applied to the circuit wiring GND. A potential (for example, a positive potential) different from the ground potential is applied to the circuit wirings C1, C2, C3, C4, C5, and C6.

The first electrical contact point 250 comprises four sliding segments 250A, 250B, 250C, and 250D, and the second electrical contact point 252 comprises sliding segments 252A, 252B, 252C, and 252D. The first electrical contact point 250 and the second electrical contact point 252 are mounted on the stop ring 208 and are able to move in the directions indicated by the arrows in accordance with rotation of the stop ring 208. The first electrical contact point 250 and the second electrical contact point 252 may be movable relative to the code plate 240.

A ground potential or the different potential is output in accordance with the position of the first electrical contact point 250 and the code plate 240, that is, the position of contact of the sliding segments 250A, 250B, 250C, and 250D and the circuit wirings GND, C1, C2, C3, C4, C5, and C6. Thereby, the lens control section 226 is able to detect information about the combination of the ground potential and the different potential which are output from the first electrical contact point 250 and the code plate 240. Similarly, the lens control section 226 is able to detect information about a combination of the ground potential and the different potential which are output from the second electrical contact point 252 and the code plate 240. FIG. 5 shows a state where the second electrical contact point 252 and the code plate 240 are in electrical contact with each other. The code plate 240 has a pattern formed by a combination of the conductive portion 242 and the non-conductive portion 244, and a combination of the ground potential and the different potential is realized.

Figure 6:
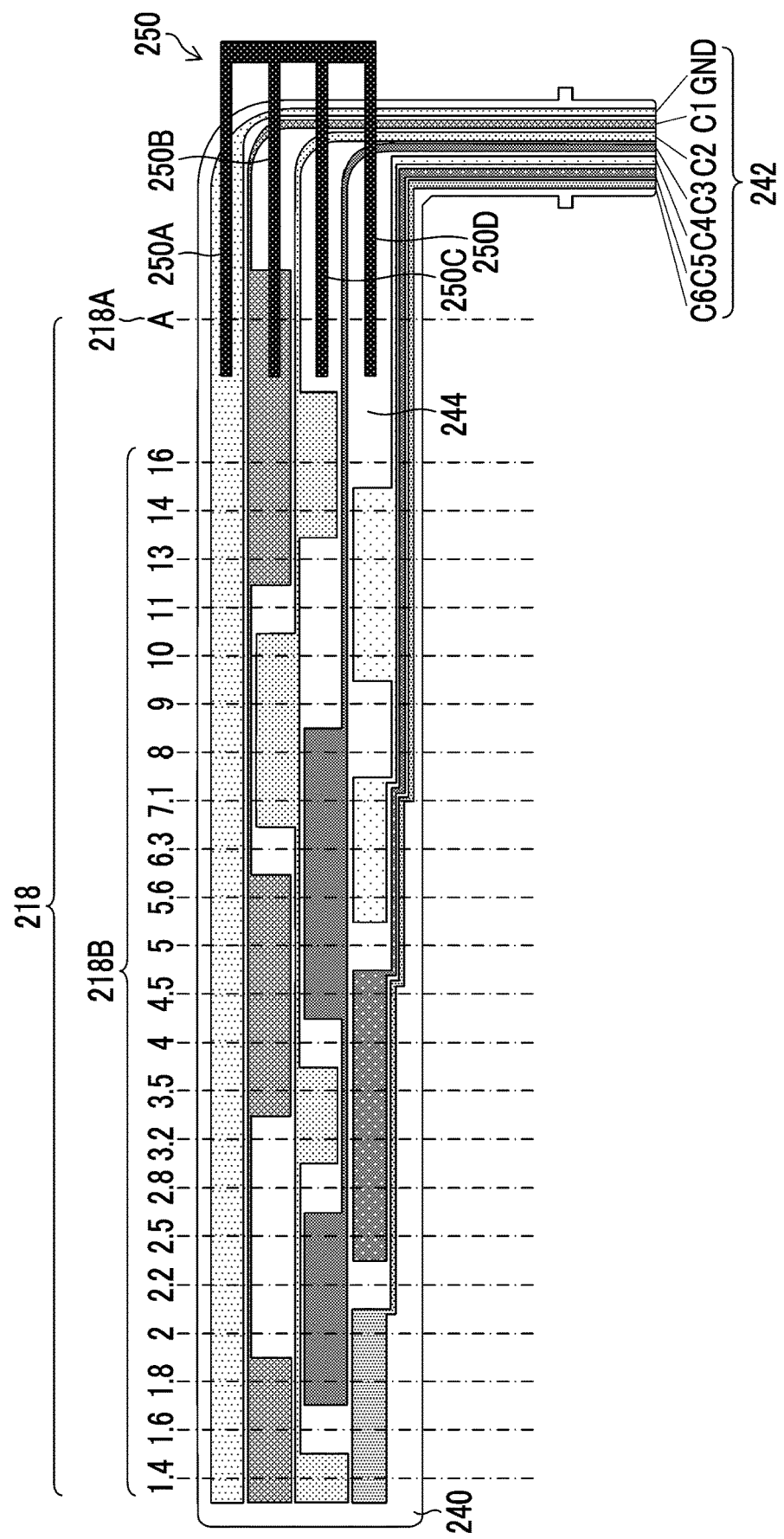
FIG. 6 is a diagram showing a relationship between a position of contact between an electrical contact point and a code plate, and auto indication and exposure amount indications in an indication area that can be selected by a stop ring.

FIG. 6 is a diagram showing the relationship between the position of contact between the first electrical contact point 250 and the code plate 240 and the auto indication 218A and exposure amount indications 218B in the first indication area 218 that can be selected by the stop ring 208. FIG. 7 is an explanatory diagram for explaining a detection signal acquired from the first electrical contact point 250 and the code plate 240. In the embodiment, a signal having the ground potential is represented by "0", and a signal having the different potential is represented by "1".

In a case where the first electrical contact point 250 is at the position of "A" of the auto indication 218A, the circuit wiring GND and the circuit wiring C1 are electrically connected, and the circuit wiring C1 is at the ground potential. The potential signal which is output from the circuit wiring C1 is "0". On the other hand, since the circuit wirings C2, C3, C4, C5, and C6 are not electrically connected to the circuit wiring GND, the potential signal which is output from the circuit wirings C2, C3, C4, C5, and C6 is "1".

In a case where the first electrical contact point 250 is at the position of "16" of the exposure amount indications 218B, the circuit wiring GND and the circuit wiring C1 are electrically connected, and the circuit wiring GND and the circuit wiring C2 are electrically connected. The circuit wiring C1 and the circuit wiring C2 are at the ground potential. The potential signal which is output from the circuit wiring C1 and the circuit wiring C2 is "0". On the other hand, since the circuit wirings C3, C4, C5, and C6 are not electrically connected to the circuit wiring GND, the potential signal which is output from the circuit wirings C2, C3, C4, C5, and C6 is "1".

As shown in the table of FIG. 7, in a case where the stop ring 208 is positioned at "A" of the auto indication 218A, the output signal of the rotational position of the stop ring 208 is "111110". Similarly, in a case where the stop ring 208 is positioned at "16" of the exposure amount indications 218B, the output signal of the rotational position of the stop ring 208 is "111100". FIG. 7 shows the auto indication 218A and the exposure amount indications 218B (16, 14, 13, 11, 10, 9, 8, 7.1, 6.3, 5.6, 5, 4.5, 4, 3.5.3.2, 2.8, 2.5, 2.2, 2, 1.8, 1.6, 1.4).

As shown in the table of FIG. 7, adjacent output signals are composed of gray codes that are changed by one bit at a time.

As the stop ring 208 rotates, two or more bits change simultaneously between adjacent electrical signals. Then, in a case where there is a time difference in signal change of two or more bits, the lens control section 226 is likely to erroneously recognize the pattern of the electrical signal. The gray code prevents the lens control section 226 from erroneously recognizing the pattern of the electrical signal.

The gray code is realized by electrical contact between the pattern of circuit wirings GND, C1, C2, C3, C4, C5, and C6 of the code plate 240 and the first electrical contact point 250 and the second electrical contact point 252.

In FIGS. 6 and 7, the electrical signal which is output from the first electrical contact point 250 and the code plate 240 is illustrated. Even in a case where the first electrical contact point 250 is replaced with the second electrical contact point 252, the same electrical signal is output from the second electrical contact point 252 and the code plate 240.

In the table of FIG. 7, the first column from the left indicates the position of the stop ring 208 as a number. The table of FIG. 7 indicates "A" as 0 and indicates "16 to 1.4" as 22 to 1. From this table, it can be understood that the lens unit 200 (not shown in the drawing) in the embodiment selects the AE processing in the auto exposure mode and the 22-step manual exposure mode.

Figure 8:
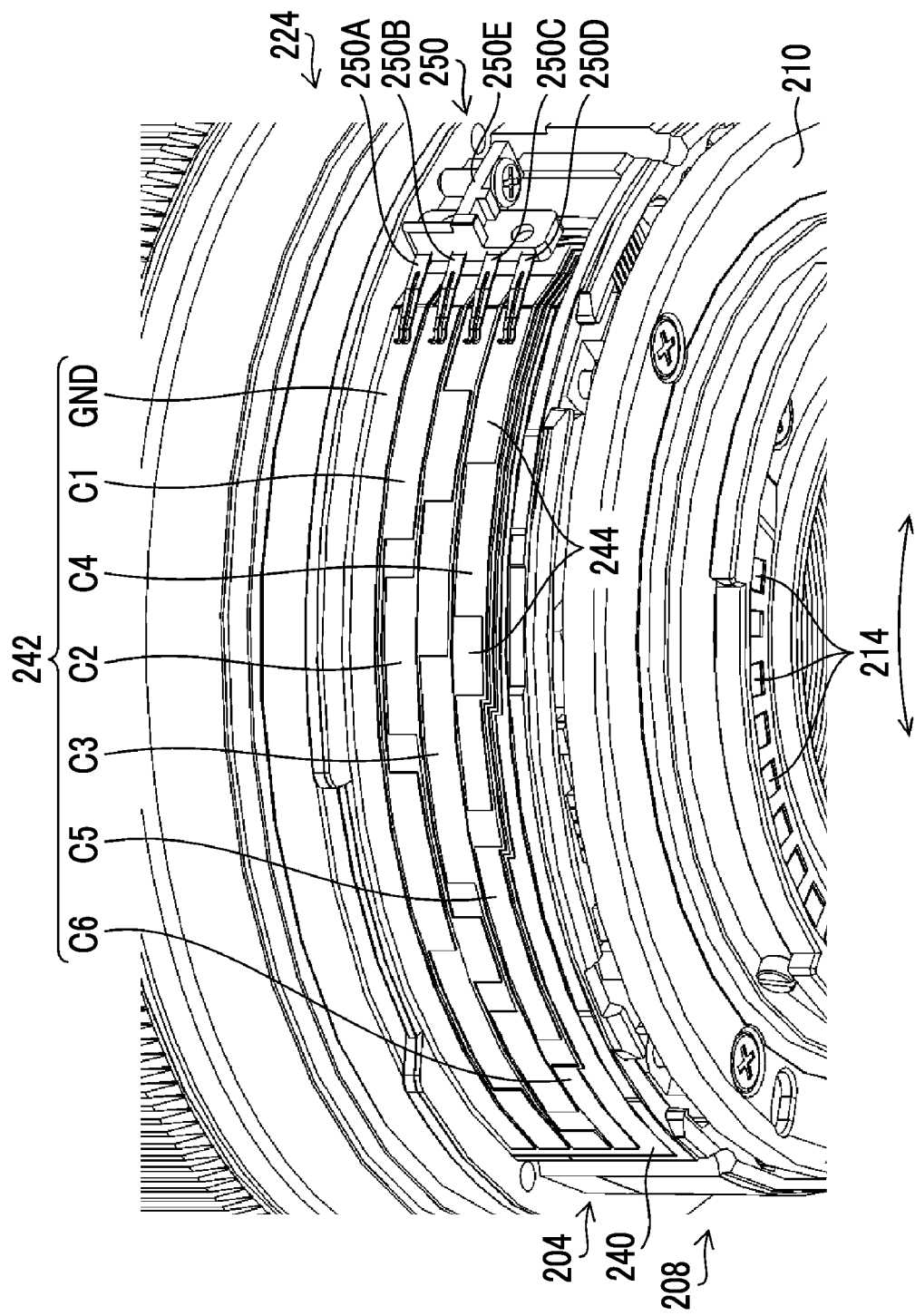
FIG. 8 is an enlarged perspective view showing a configuration of a position sensor provided in the lens unit.

FIG. 8 is an enlarged perspective view showing the configuration of the position sensor 224 provided in the lens unit 200. The same components as those already described may be denoted by the same reference numerals, and description thereof may be omitted. As shown in FIG. 8, the code plate 240 composing the position sensor 224 is mounted on the outer peripheral surface of the lens barrel 204. As described above, the code plate 240 comprises: a conductive portion 242 composed of the circuit wirings GND, C1, C2, C3, C4, C5, and C6; and a non-conductive portion 244 which is not composed of the circuit wirings GND, C1, C2, C3, C4, C5, and C6. The first electrical contact point 250 composing the position sensor 224 is mounted on the stop ring 208 by using a screw 250E. By rotating the stop ring 208, the first electrical contact point 250 moves while sliding on the code plate 240 in the directions of the arrows. As a result, the position of contact between the code plate 240 and the first electrical contact point 250 changes. The second electrical contact point 252 is disposed to be separated from the first electrical contact point 250, and is not shown in the drawing. Similar to the first electrical contact point 250, the position of contact of the second electrical contact point 252 with the code plate 240 is changed by rotating the stop ring 208.

As shown in FIG. 4, the lens control section 226 obtains information about the rotational position of the stop ring 208 from the output signal by the position sensor 224 described above. The camera control section 140 receives information about the rotational position of the stop ring 208 from the lens control section 226. In a case where imaging processing is performed, the camera control section 140 transmits a control signal to the lens control section 226 on the basis of information about the rotational position of the stop ring 208. The stop diameter of the stop unit 232 is changed to have an exposure amount corresponding to the rotational position of the stop ring 208.

Figure 19:
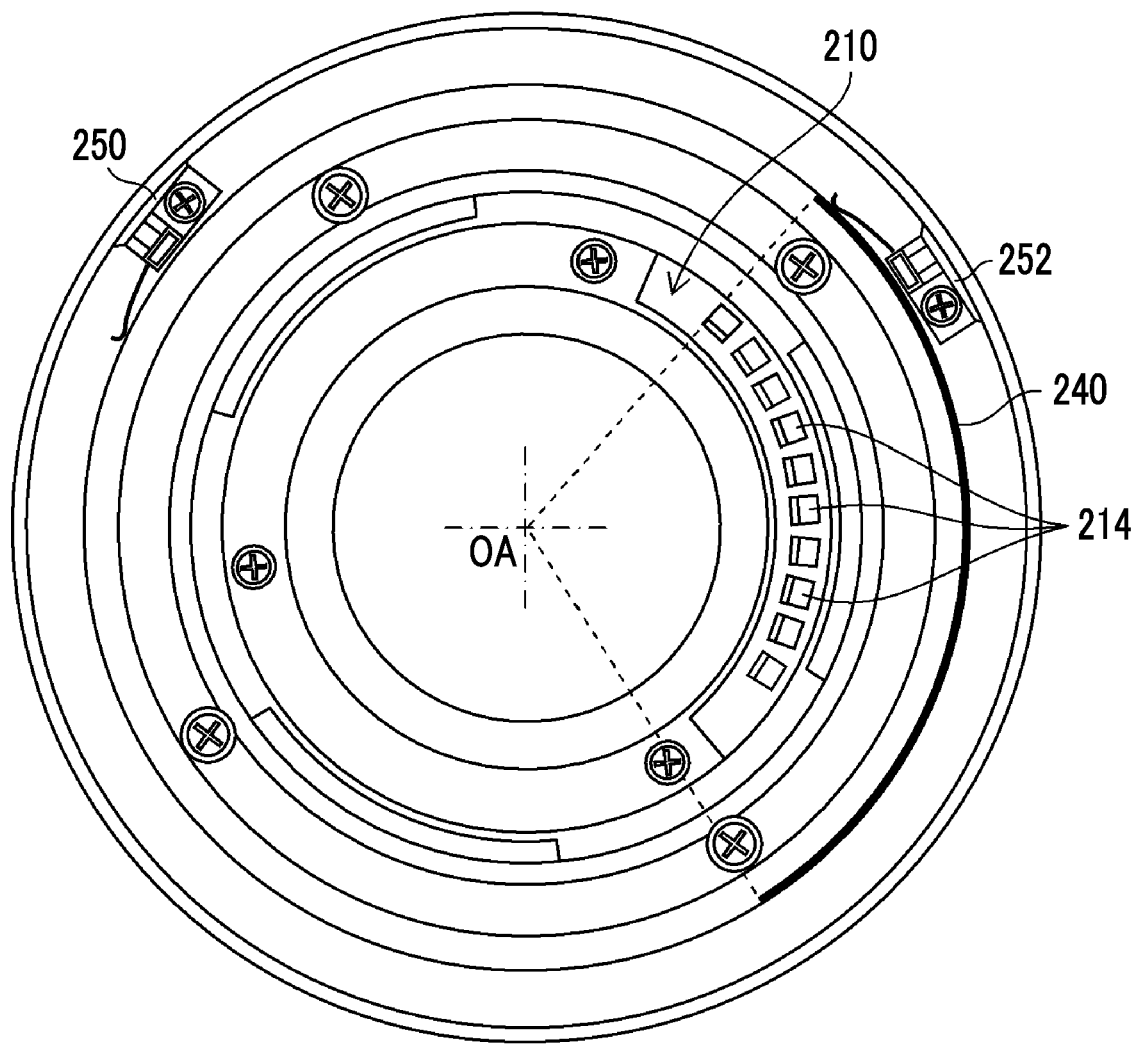
FIG. 19 is a bottom view of the lens unit as viewed from the lens mount side.
Figure 20:
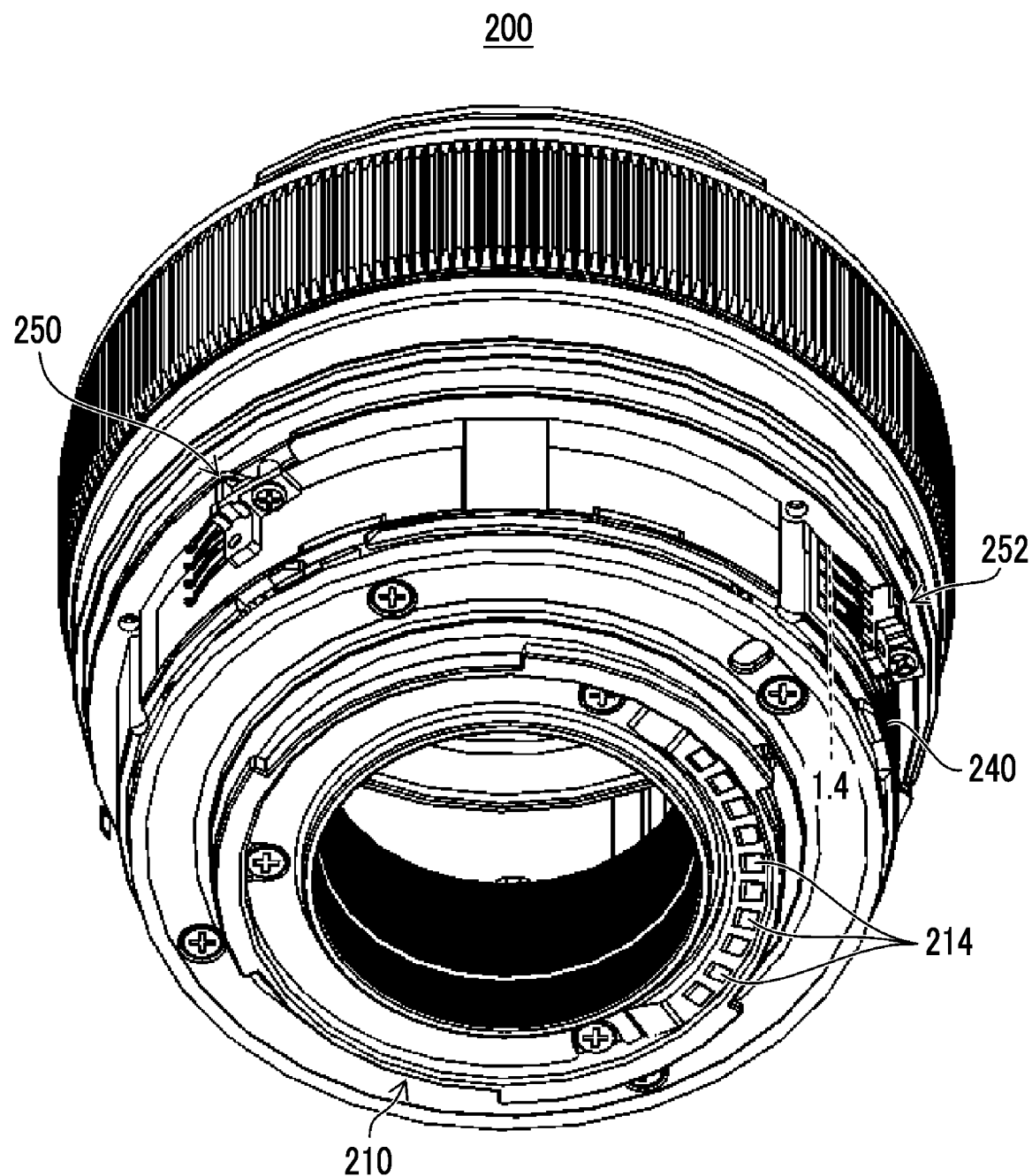
FIG. 20 is a perspective view of the lens unit as viewed from the lens mount side.

Next, the operation of the lens unit 200 will be described with reference to FIG. 20. FIGS. 9, 12, 15, and 18 are front views of the lens unit 200 in a case where the index 222 is viewed from the front. FIGS. 10, 13, 16, and 19 are bottom views of the lens unit 200 as viewed from the lens mount 210 side. FIGS. 11, 14, 17, and 20 are perspective views of the lens unit 200 as viewed from the lens mount 210 side. These drawings show states in which the index 222 is aligned with the auto indication 218A, the auto indication 220A, a representative value of the exposure amount indications 218B, and a representative value of the exposure amount indications 220B of the stop ring 208.

Figure 9:
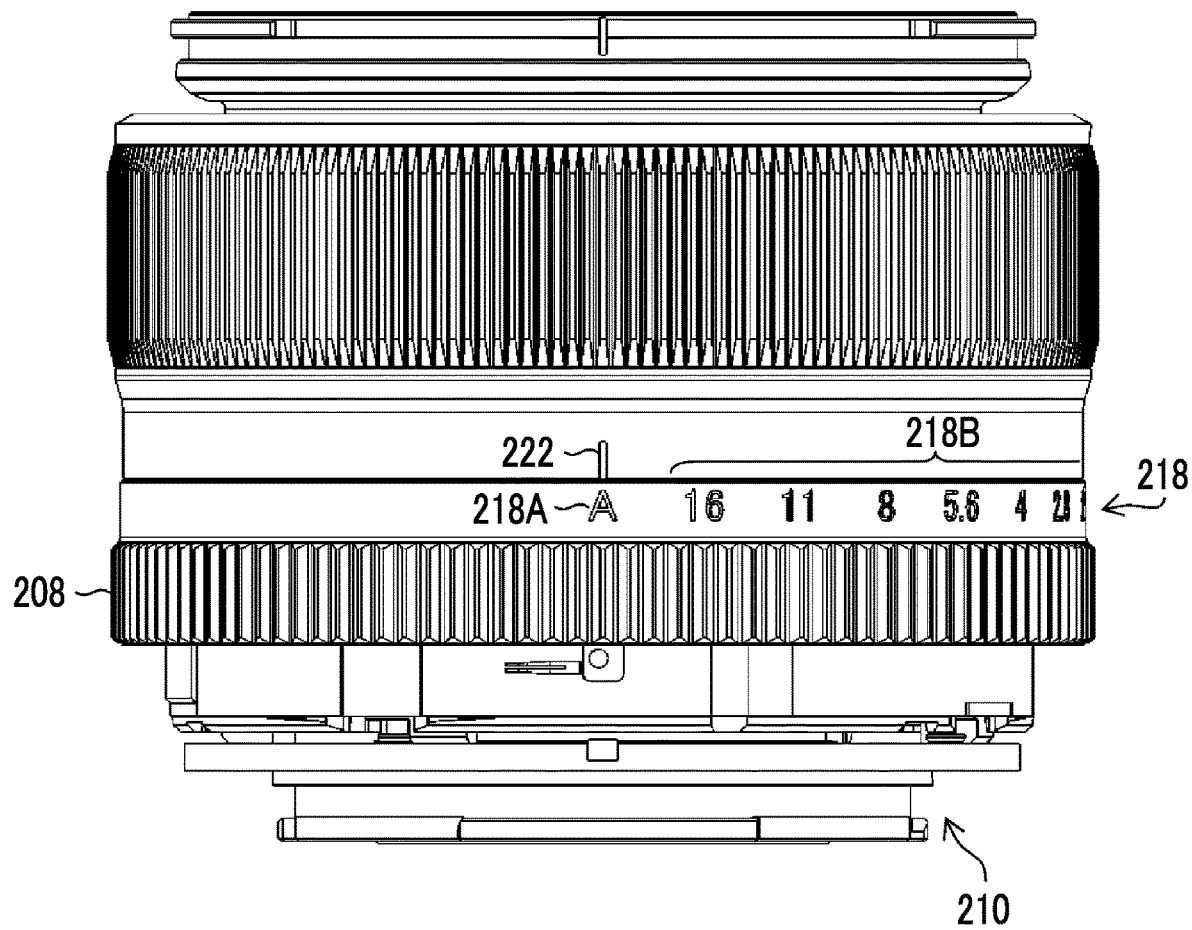
FIG. 9 is a front view of the lens unit in a case where an index is viewed from the front.
Figure 10:
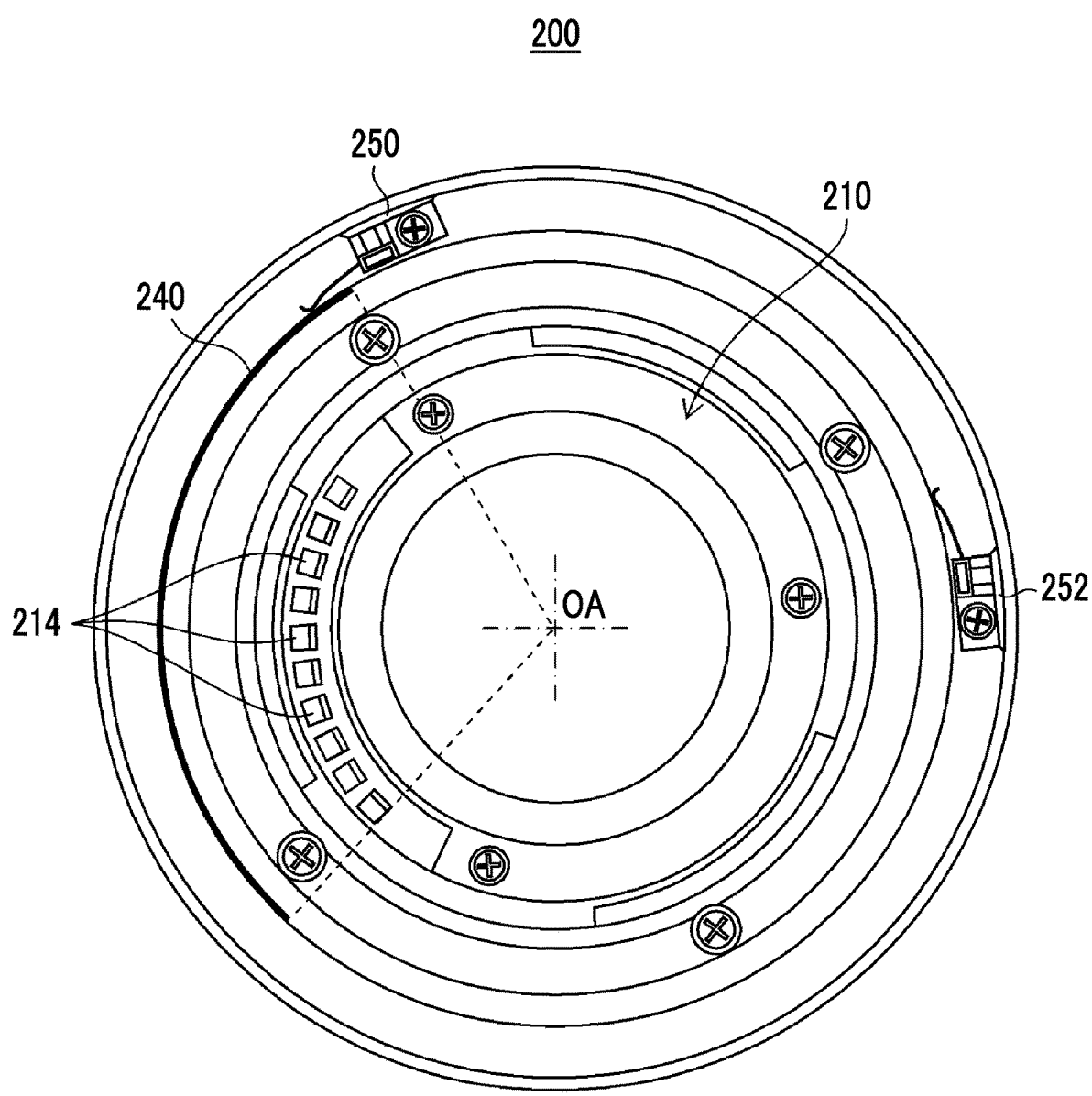
FIG. 10 is a bottom view of the lens unit as viewed from the lens mount side.
Figure 11:
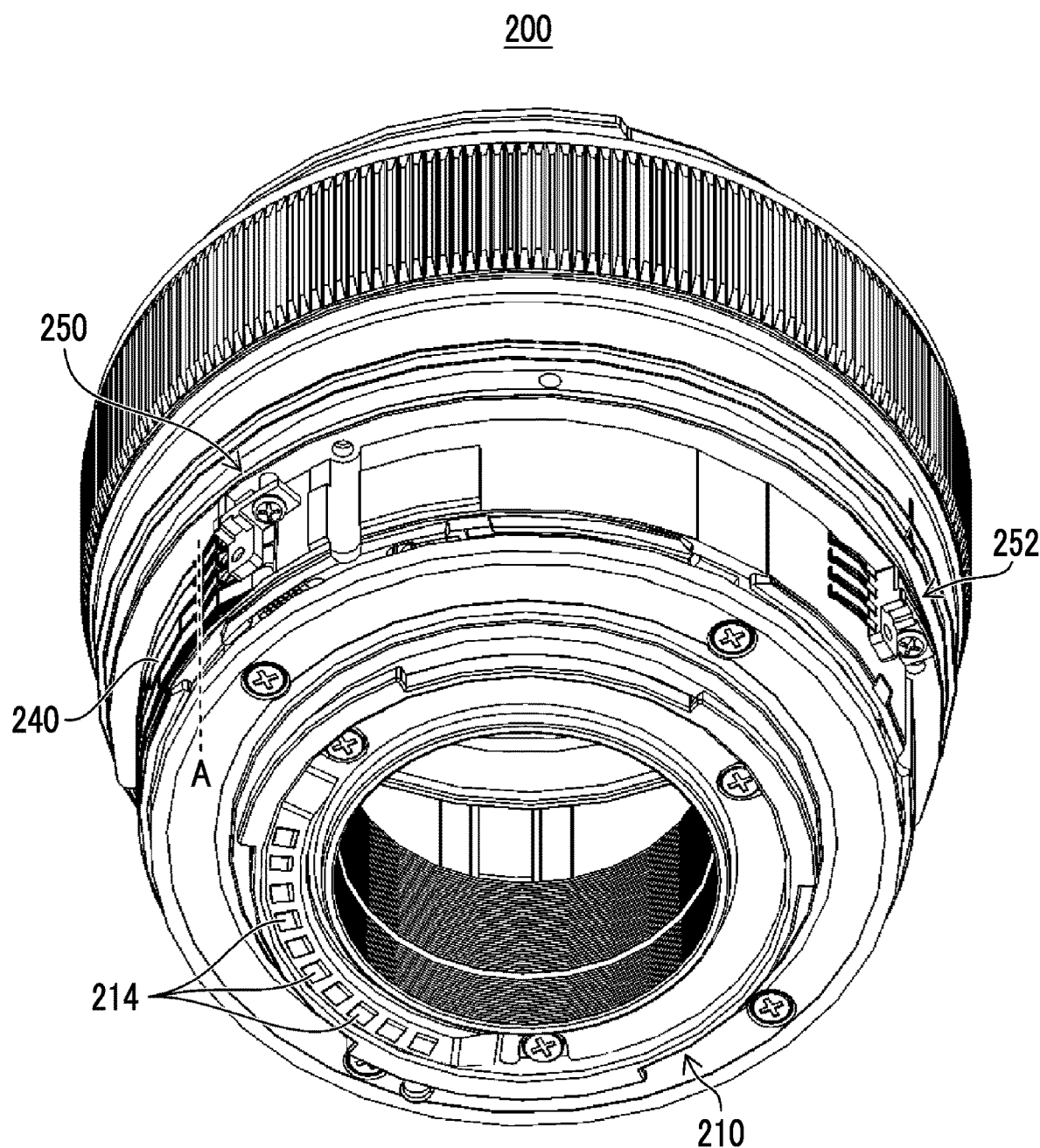
FIG. 11 is a perspective view of the lens unit as viewed from the lens mount side.

As shown in FIG. 9, "A" which is the auto indication 218A in the first indication area 218 is aligned with the index 222. In a case of imaging, the AE processing is possible. As shown in FIG. 10, the first electrical contact point 250 is in electrical contact with the code plate 240. On the other hand, the second electrical contact point 252 is not in electrical contact with the code plate 240. Further, as shown in FIG. 11, at the rotational position (refer to FIG. 6) of "A" of the code plate 240, the first electrical contact point 250 is in contact with a conductive portion 242 (not shown in the drawing) and a non-conductive portion 244 (not shown in the drawing) of the code plate 240.

Figure 12:
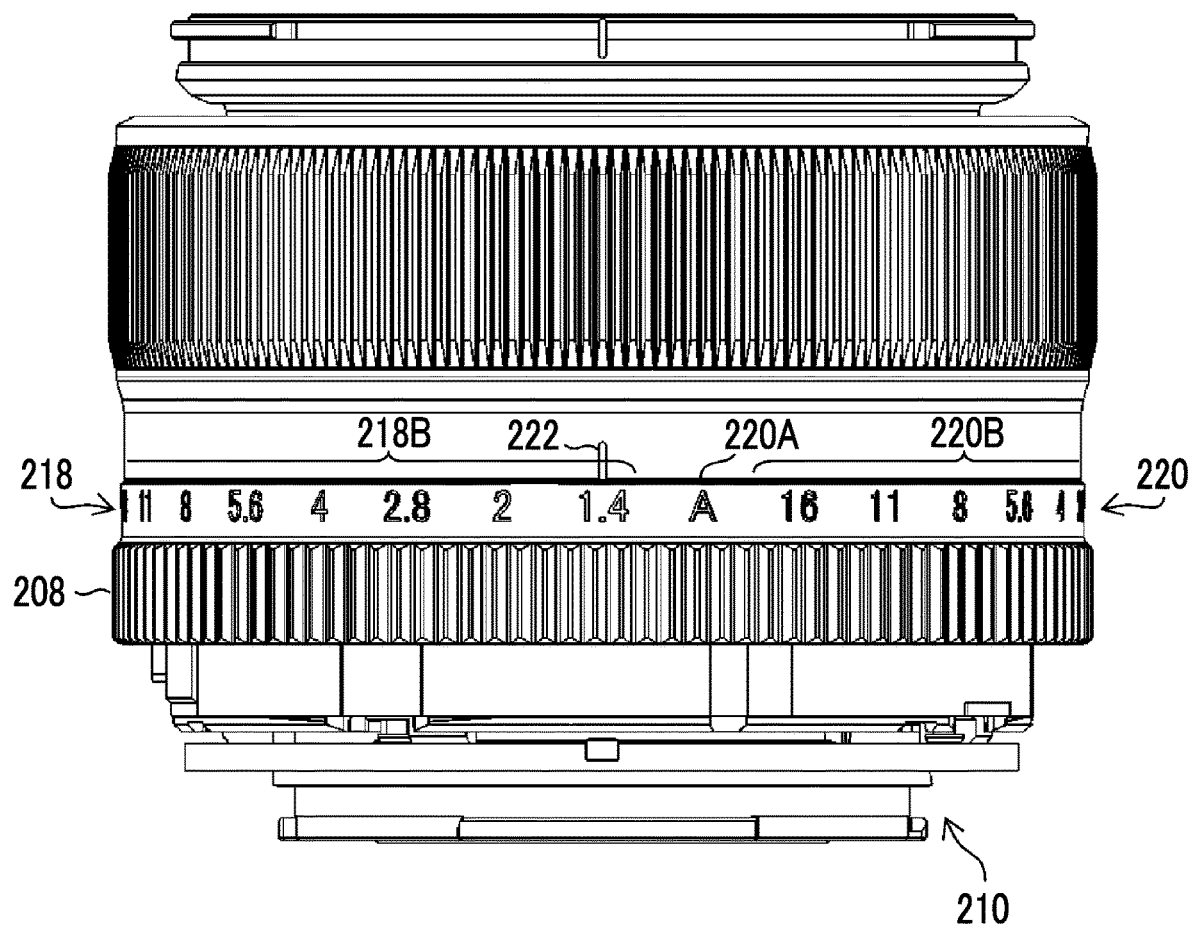
FIG. 12 is a front view of the lens unit in a case where the index is viewed from the front.
Figure 13:
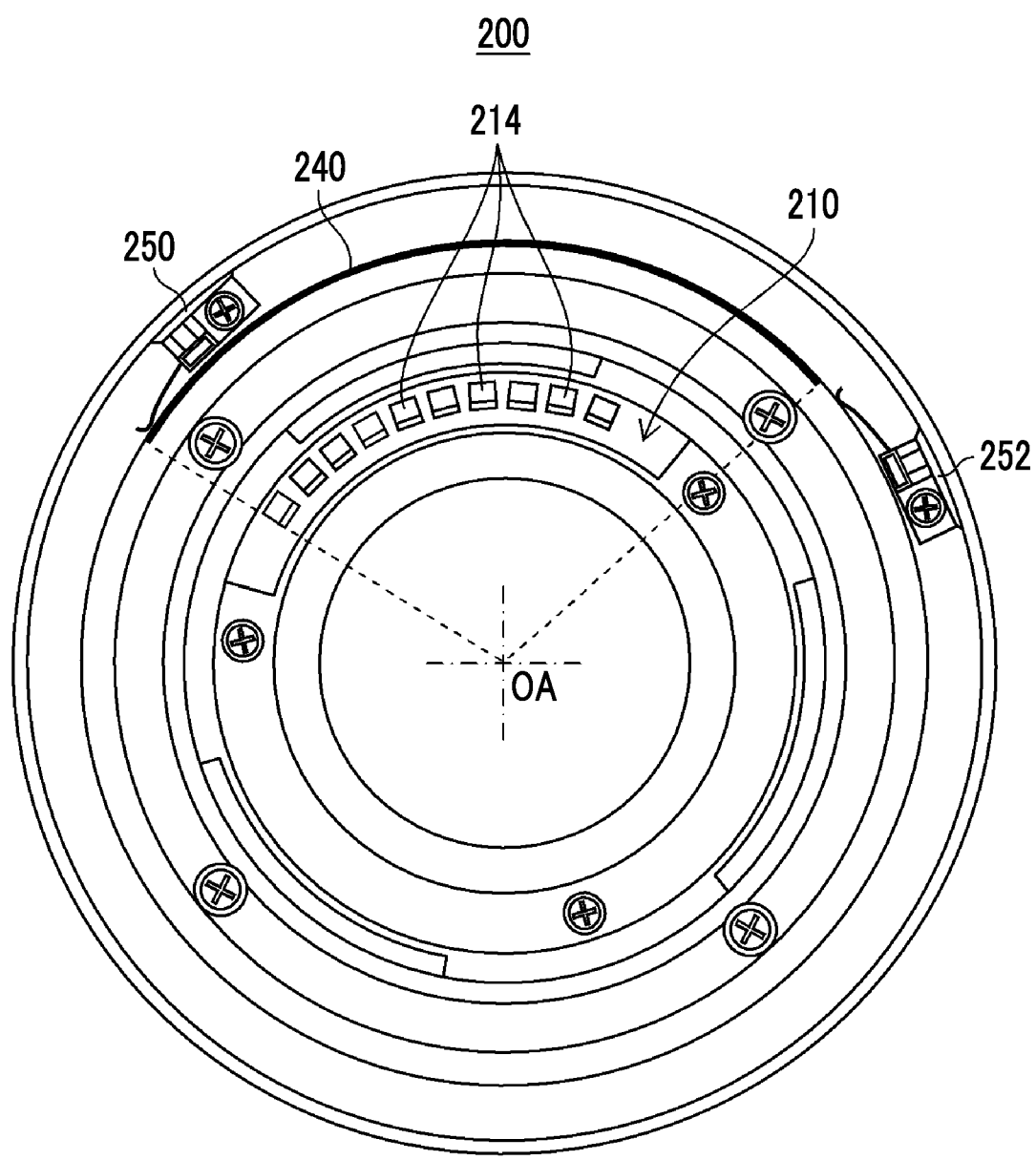
FIG. 13 is a bottom view of the lens unit as viewed from the lens mount side.
Figure 14:
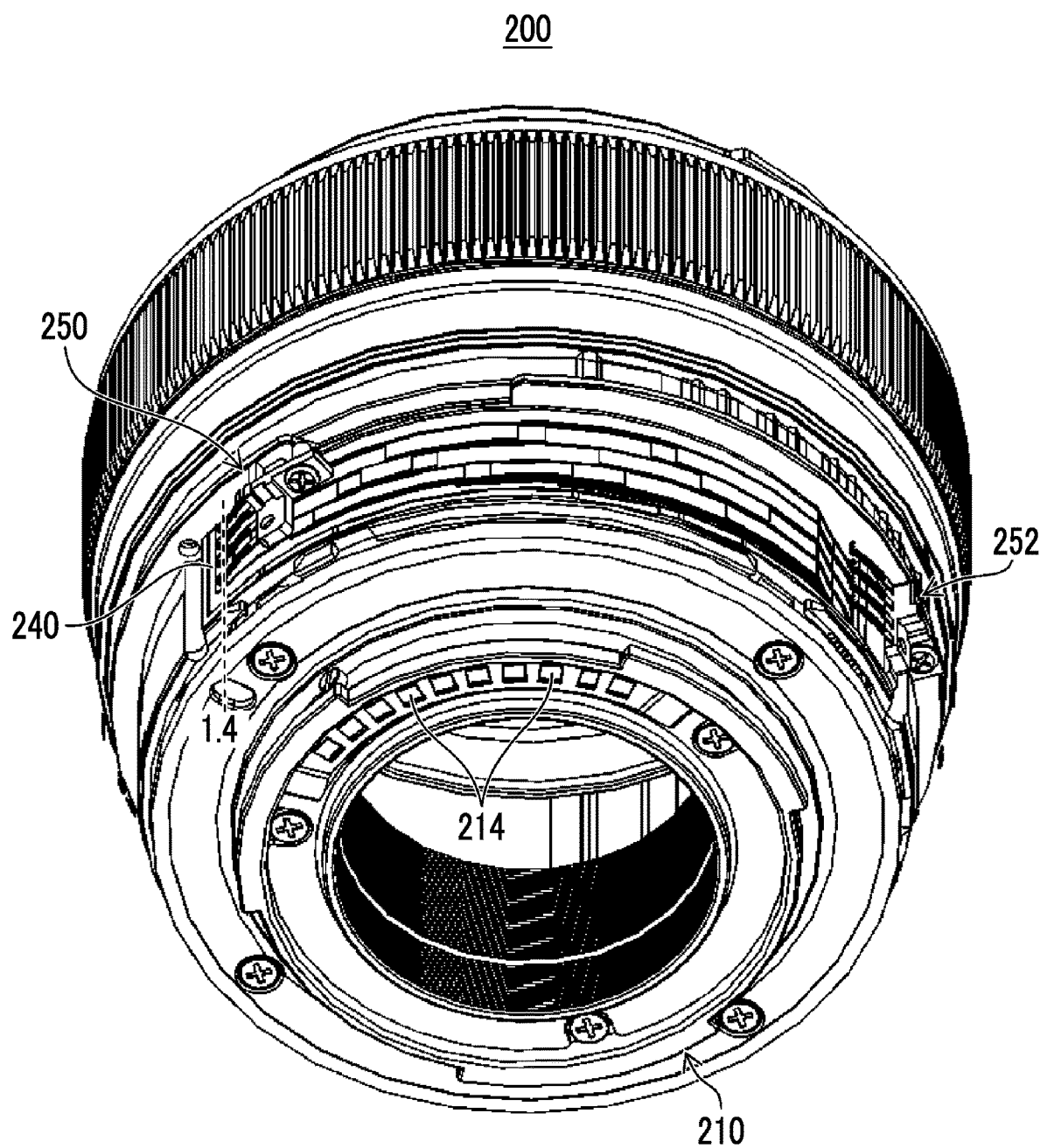
FIG. 14 is a perspective view of the lens unit as viewed from the lens mount side.

As shown in FIG. 12, "1.4" of the exposure amount indications 218B in the first indication area 218 is aligned with the index 222. In a case of imaging, the exposure amount is adjusted to an F number of 1.4. As shown in FIG. 13, the first electrical contact point 250 is in electrical contact with the code plate 240. On the other hand, the second electrical contact point 252 is not in electrical contact with the code plate 240. Further, as shown in FIG. 14, at the rotational position (refer to FIG. 6) of "1.4" of the code plate 240, the first electrical contact point 250 is in contact with a conductive portion 242 (not shown in the drawing) and a non-conductive portion 244 (not shown in the drawing) of the code plate 240.

Figure 15:
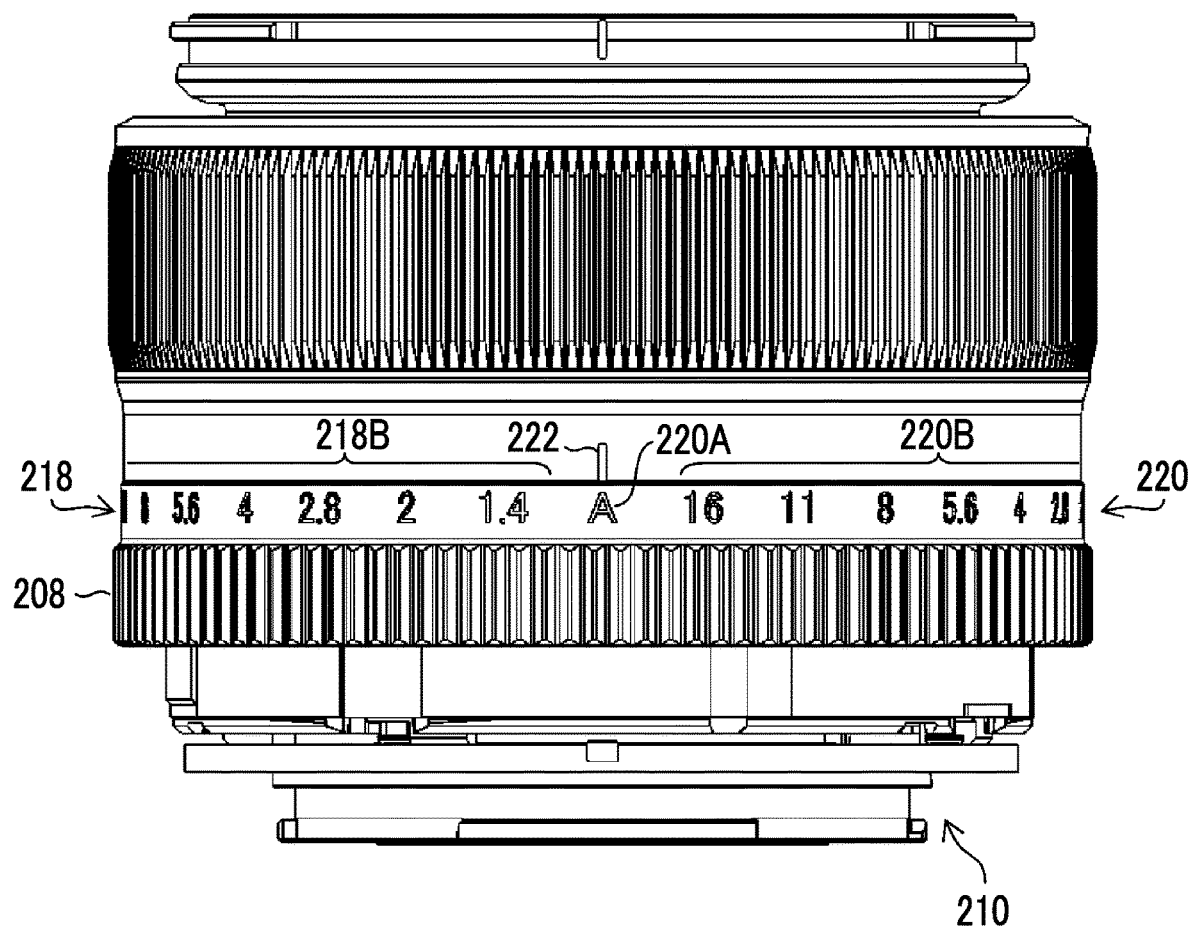
FIG. 15 is a front view of the lens unit in a case where the index is viewed from the front.
Figure 16:
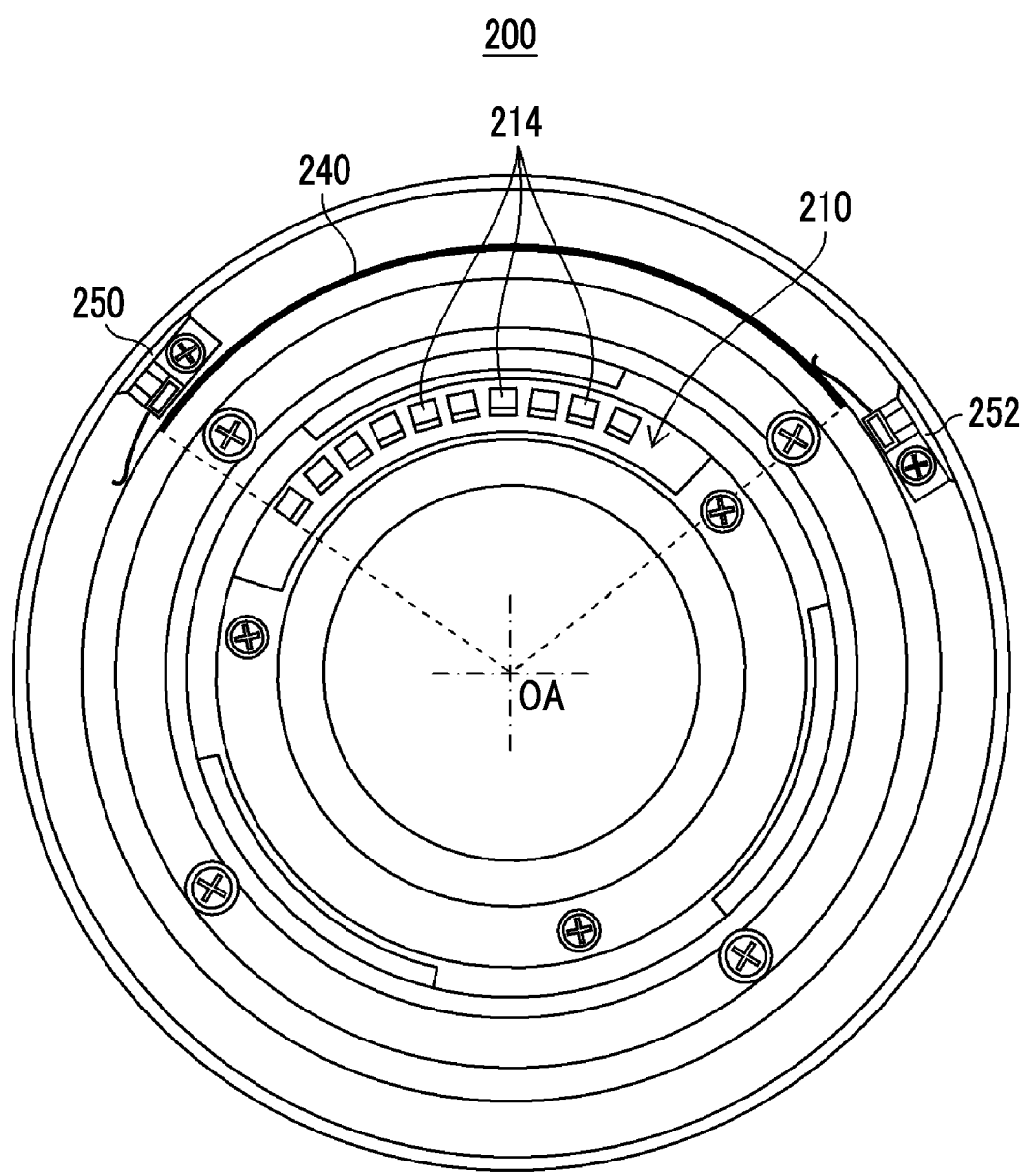
FIG. 16 is a bottom view of the lens unit as viewed from the lens mount side.
Figure 17:
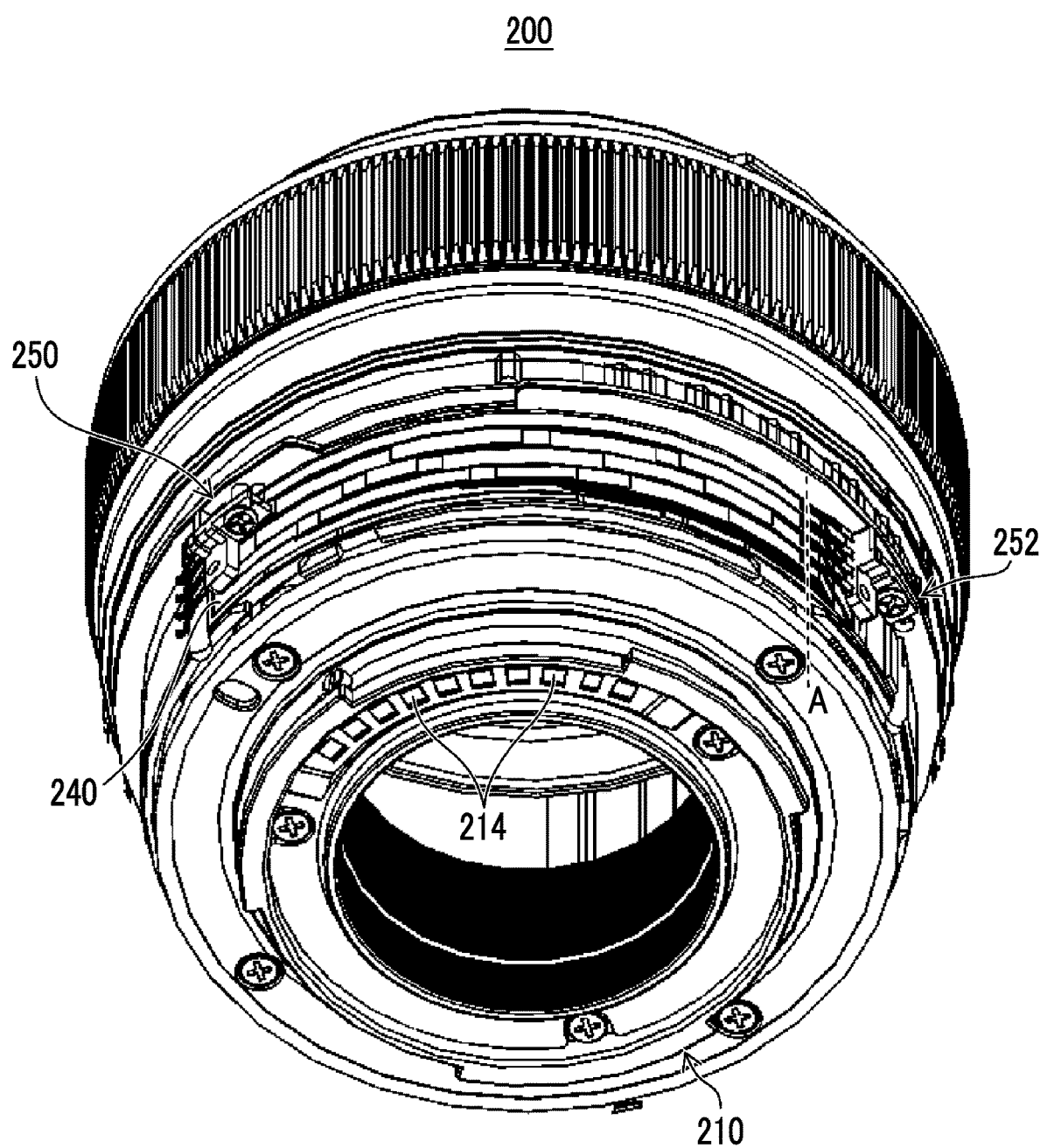
FIG. 17 is a perspective view of the lens unit as viewed from the lens mount side.

As shown in FIG. 15, "A" which is the auto indication 220A in the second indication area 220 is aligned with the index 222. In a case of imaging, the AE processing is possible. As shown in FIG. 16, the second electrical contact point 252 is in electrical contact with the code plate 240. On the other hand, the first electrical contact point 250 is not in electrical contact with the code plate 240. Further, as shown in FIG. 17, at the rotational position (refer to FIG. 6) of "A" of the code plate 240, the second electrical contact point 252 is in contact with a conductive portion 242 (not shown in the drawing) and a non-conductive portion 244 (not shown in the drawing) of the code plate 240.

Figure 18:
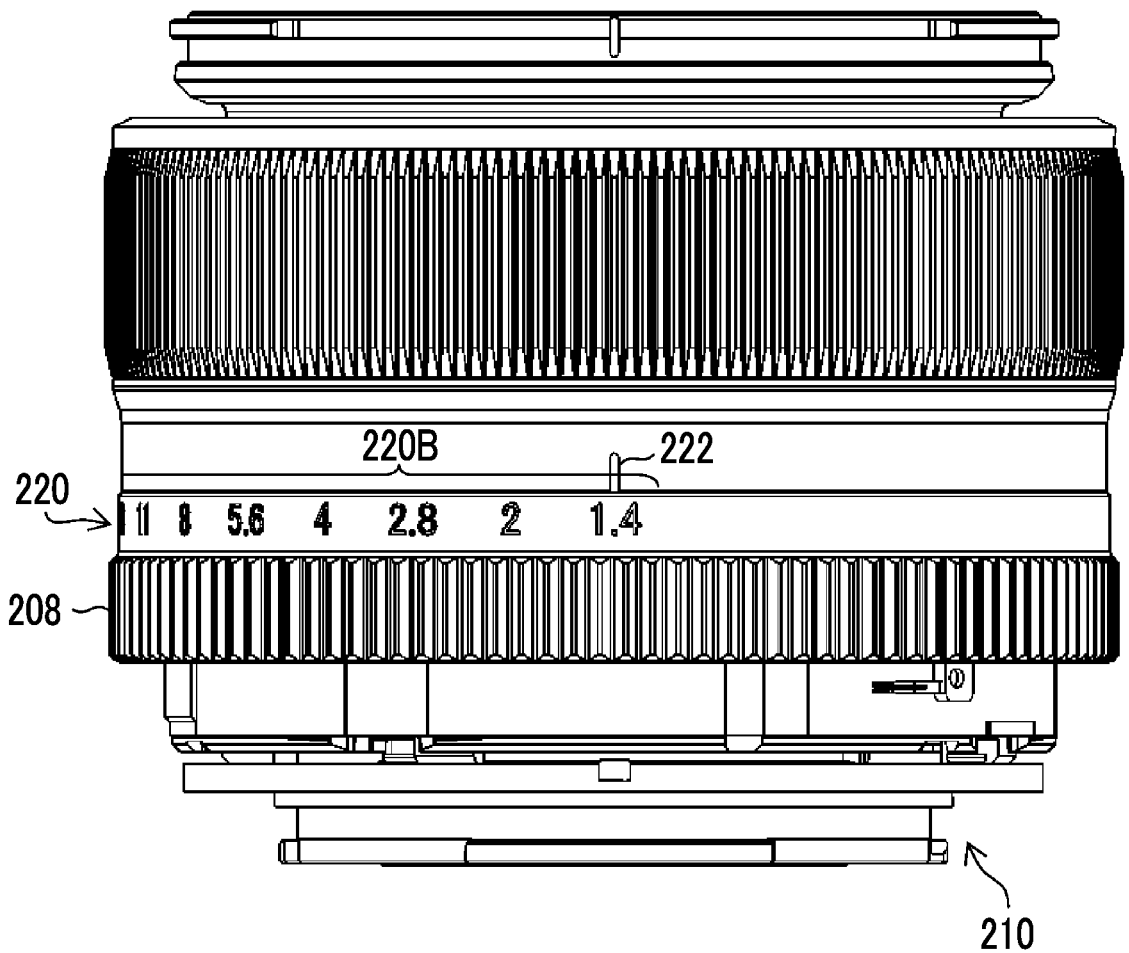
FIG. 18 is a front view of the lens unit in a case where the index is viewed from the front.

As shown in FIG. 18, "1.4" of the exposure amount indications 218B in the first indication area 218 is aligned with the index 222. In a case of imaging, the exposure amount is adjusted to an F number of 1.4. As shown in FIG. 19, the second electrical contact point 252 is in electrical contact with the code plate 240. On the other hand, the first electrical contact point 250 is not in electrical contact with the code plate 240. Further, as shown in FIG. 20, at the rotational position (refer to FIG. 6) of "1.4" of the code plate 240, the second electrical contact point 252 is in contact with a conductive portion 242 (not shown in the drawing) and a non-conductive portion 244 (not shown in the drawing) of the code plate 240.

As described above, in the lens unit 200, any one of the auto indication 218A, the auto indication 220A, the exposure amount indications 218B, and the exposure amount indications 220B can be selected between the first indication area 218 and the second indication area 220. In the embodiment of FIGS. 9 to 20, each of the first indication area 218 and the second indication area 220 has a central angle of around 100 degrees with respect to the optical axis OA as an axis. The rotation of the stop ring 208 is regulated, and the stop ring 208 can be rotated within the range of the auto indication 218A in the first indication area 218 to "1.4" of the exposure amount indications 220B in the second indication area 220 (for example, a rotation angle of about 200 degrees).

Figure 21:
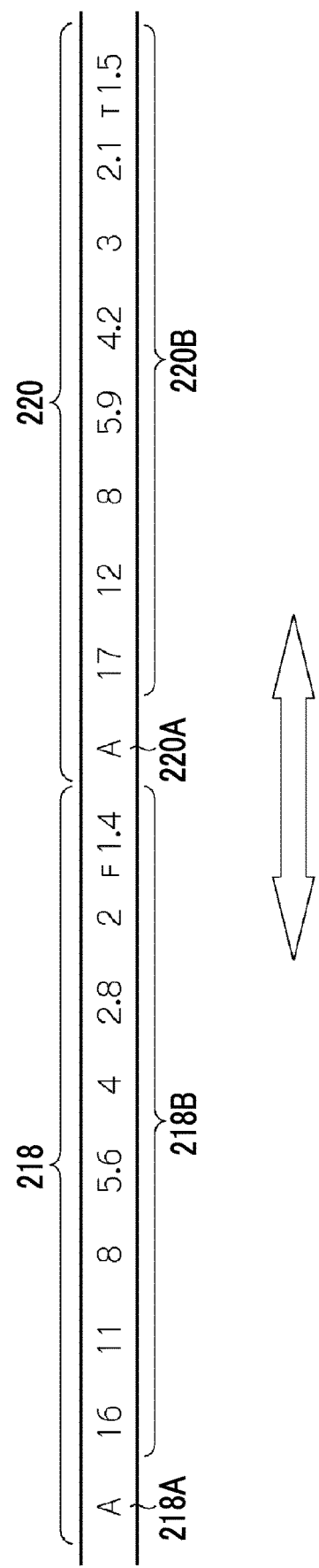
FIG. 21 is a development view of a plurality of indication areas of the stop ring.
Figure 22:
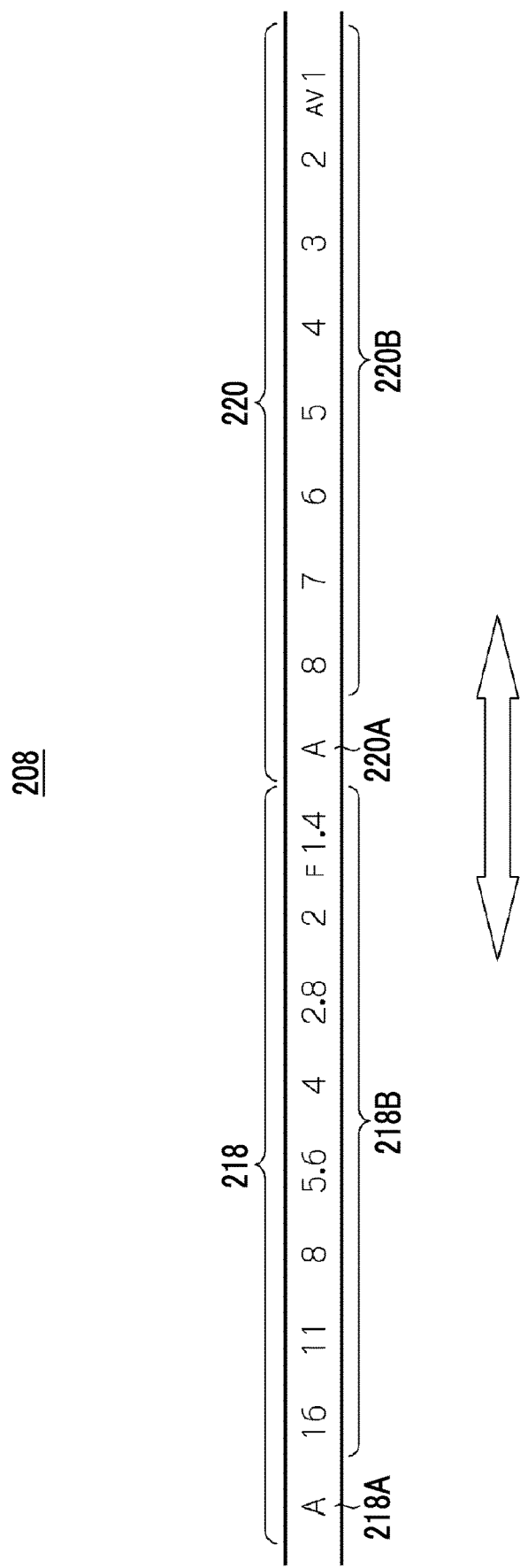
FIG. 22 is a development view of a plurality of indication areas of the stop ring.
Figure 23:
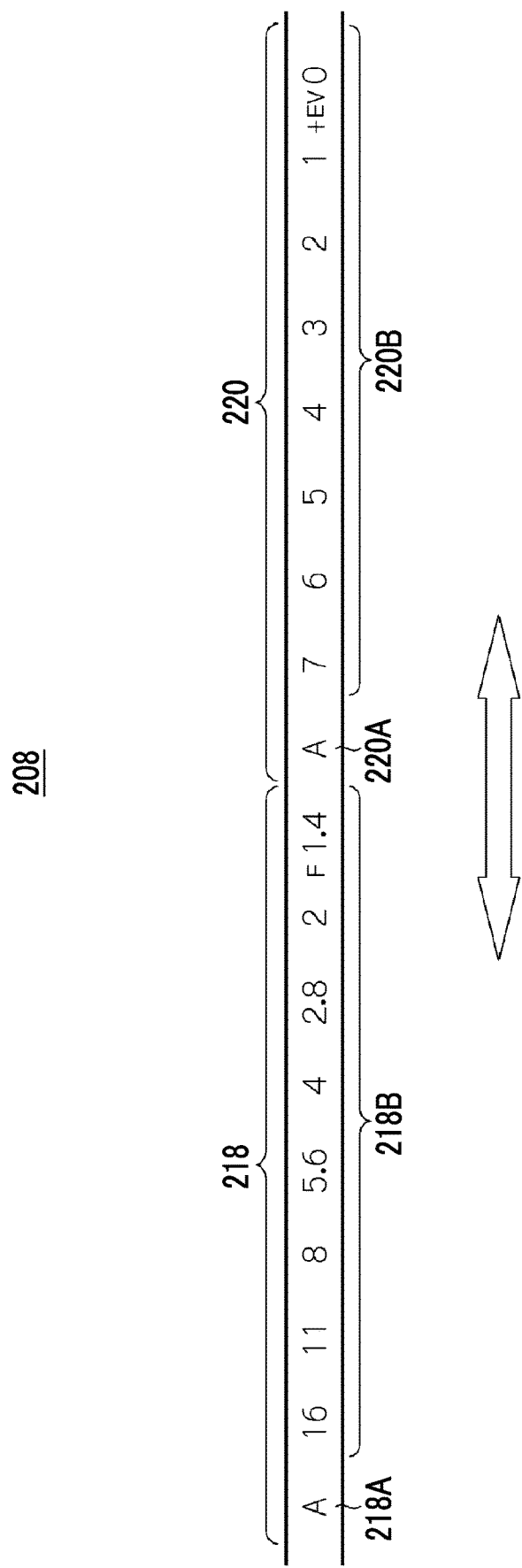
FIG. 23 is a development view of a plurality of indication areas of the stop ring.

Although the exemplary case where the first indication area 218 and the second indication area 220 are the F numbers as the exposure amount indications is described, the exposure amount indications are not limited to the F numbers. FIGS. 21, 22, and 23 are developed views of a plurality of indication areas of the stop ring 208 including values other than the F numbers as the exposure amount indications.

As shown in FIG. 21, the exposure amount indications 218B in the first indication area 218 are F numbers. On the other hand, the exposure amount indications 220B in the second indication area 220 are T values which are different indications correlated with the F numbers. The F number is a ratio (f/D) of a focal length f to an effective diameter D of the lens. The T value is a value where the F number and a transmittance of the lens are considered. The T value is a value obtained by $(F\ number \times 10)/(transmittance\ \%)^{1/2}$. The F number and the T value are correlated with each other.

As shown in FIG. 22, the exposure amount indications 218B in the first indication area 218 are F numbers. On the other hand, the exposure amount indications 220B in the second indication area 220 are AV values which are different indications correlated with the F numbers. The AV value is a value obtained by $2\ \log_2(F\ number)$, and the F number and the AV value are correlated with each other.

As shown in FIG. 23, the exposure amount indications 218B in the first indication area 218 are F numbers. On the other hand, the exposure amount indications 220B in the second indication area 220 are +EV values that are difference values from the open F number and are correlated with the F numbers. In the embodiment, the open F number is 1.4. Since the +EV value is a difference value of the open F number, the difference between the open F number and the F number of 1.4 is 0. Similar to the AV value, the difference is expressed as "1" in a case where the difference is ½. The F number is correlated with the +EV value that is a difference value from the open F number.

As shown in FIGS. 21 to 23, the exposure amount indications of one of the plurality of indication areas are F numbers, and the other exposure amount indications are used as different indications correlated with the F numbers. Thereby, it is possible to select exposure amount indications that are easy for a user to use.

FIGS. 3, 21, 22, and 23 show the stop ring 208 on which the first indication area 218 and the second indication area 220 are indicated. The indication areas are not limited to the above-mentioned configuration. For example, an additional auto indication corresponding to the auto exposure mode can be added to the first indication area 218 and the second indication area 220 composing the plurality of indication areas. For example, "A" (not shown in the drawing) of the additional auto indication can be adjacent to and added to the second indication area 220. "A" of the additional auto indication reduces the amount of rotation in a case where the stop ring 208 is rotated.

FIGS. 3, 21, 22, and 23 show examples in which the plurality of indication areas are composed of the first indication area 218 and the second indication area 220. In these configuration examples, rotation of the stop ring 208 is regulated. However, the number of the plurality of indication areas may be two or more, and rotation of the stop ring 208 may not be regulated.

Figure 24:
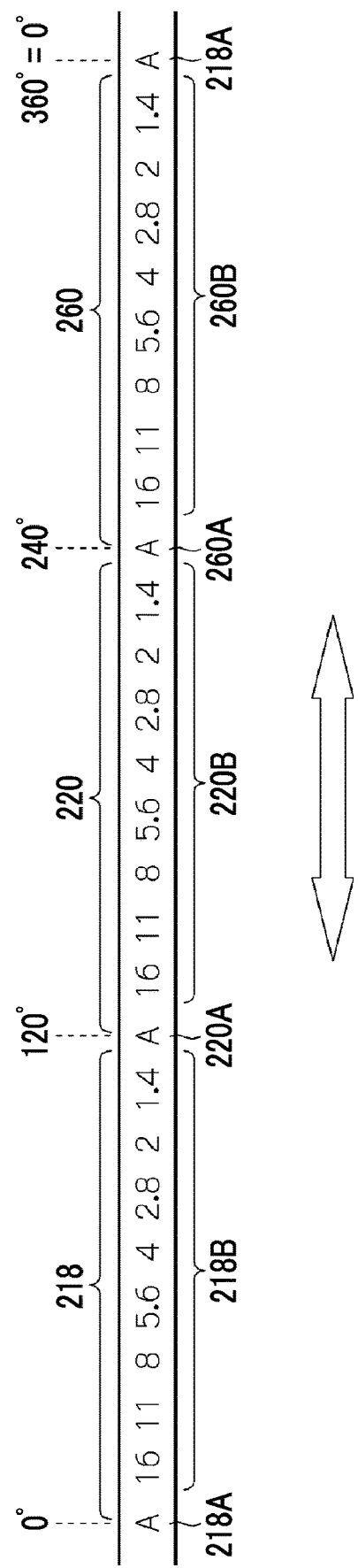
FIG. 24 is a development view of a plurality of indication areas of the stop ring.

FIG. 24 is a development view of the three indication areas of the stop ring 208. As shown in FIG. 24, the stop ring 208 further comprises a third indication area 260 in addition to the first indication area 218 and the second indication area 220. The third indication area 260 includes an auto indication 260A and exposure amount indications 260B. The first indication area 218, the second indication area 220, and the third indication area 260 each have a central angle of 120 degrees with respect to the optical axis OA as an axis. Therefore, the sum of the central angles of the first indication area 218, the second indication area 220, and the third indication area 260 is 360 degrees. The first indication area 218, the second indication area 220, and the third indication area 260 are arranged on the entire outer periphery of the stop ring 208. Accordingly, the stop ring 208 can be rotated 360 degrees.

Similar to the above-mentioned configuration, the first indication area 218, the second indication area 220, and the third indication area 260 have periodicity.

The sum of the central angles of a plurality of indication areas composed of the first indication area 218, the second indication area 220, and the third indication area 260 can be set to 360 degrees. The first indication area 218, the second indication area 220, and the third indication area 260 are continuously arranged around the outer peripheral surface of the lens barrel 204 (not shown in the drawing). By setting the central angle of the plurality of indication areas to 360 degrees, the stop ring 208 can be configured to endlessly rotate without regulation of rotation around the outer peripheral surface of the lens barrel 204 (not shown in the drawing). The user is able to rotate the stop ring 208 regardless of the rotation end of the stop ring 208.

The embodiment of FIG. 24 describes the exemplary case where the sum of the central angles of the first indication area 218, the second indication area 220, and the third indication area 260 is 360 degrees. However, the present invention is not limited to this, and the sum of the central angles of the plurality of indication areas may be 360 degrees. Therefore, two indication areas each may have a central angle of 180 degrees, and four central areas each may have a central angle of 90 degrees. In order to detect the rotational position of the stop ring 208 and the plurality of indication areas, it is preferable that the stop ring 208 is provided with one code plate and electrical contact points corresponding to the number of the plurality of indication areas.

EXPLANATION OF REFERENCES

1: camera system
100: camera body
102: release switch
104: exposure compensation dial
106: shutter speed dial
108: focus mode switching lever
110: viewfinder switching lever
112: lens attachment/detachment button
114: power lever
116: hot shoe
118: electronic viewfinder
119: optical viewfinder window
120: grip
122: body mount
132: lock pin
136: body signal contact point
138: image sensor
140: camera control section
142: bus line
144: image memory
146: image data processing section
148: LCD driver
150: image display section
152: card I/F
154: AE processing section
156: memory card
200: lens unit
202: optical system
204: lens barrel
206: focus ring
208: stop ring
210: lens mount
212: mount cover
214: lens signal contact point
218: first indication area
218A: auto indication
218B: exposure amount indications
220: second indication area
220A: auto indication
220B: exposure amount indications
222: indicator
224: position sensor
226: lens control section
228: motor driver
230: motor
232: stop unit
232A: stop leaf blade
240: code plate
242: conductive portion
244: non-conductive portion
250: first electrical contact point
250A: sliding section
250B: sliding section
250C: sliding section
250D: sliding section
250E: screw
252: second electrical contact point
252A: sliding section
252B: sliding section
252C: sliding section
252D: sliding section
260: third indication area
260A: auto indication
260B: exposure amount indications
C1, C2, C3, C4, C5, C6, GND: circuit wiring
OA: optical axis

What is claimed is:

1. A lens unit comprising:
an optical system that includes at least one lens;
a lens barrel that houses the optical system; and
a stop ring that is disposed on an outer peripheral surface of the lens barrel so as to be rotatable around an axis,
wherein the stop ring includes a plurality of indication areas, each of the indication areas includes an auto indication corresponding to an auto exposure mode and exposure amount indications corresponding to a manual exposure mode, and the plurality of indication areas have periodicity.

2. The lens unit according to claim 1,
wherein in each of the indication areas, a minimum exposure amount indication of the exposure amount indications and the auto indication are adjacent to each other.

3. The lens unit according to claim 1,
wherein in each of the indication areas, a maximum exposure amount indication of the exposure amount indications and the auto indication are adjacent to each other.

4. The lens unit according to claim 1,
wherein the exposure amount indications of the plurality of indication areas are F numbers.

5. The lens unit according to claim 1,
wherein the exposure amount indications of one of the plurality of indication areas are F numbers, and the other exposure amount indications are different indications correlated with the F numbers.

6. The lens unit according to claim 5,
wherein the different indications include any of T values, AV values, and difference values from an open F number.

7. The lens unit according to claim 1,
wherein the stop ring includes an additional auto indication corresponding to the auto exposure mode, in addition to the plurality of indication areas.

8. The lens unit according to claim 1,
wherein a sum of central angles of the indication areas with respect to the axis is 360°.

9. The lens unit according to claim 8,
wherein the stop ring rotates endlessly around the outer peripheral surface of the lens barrel.

10. The lens unit according to claim 1,
wherein depending on a rotational position of the stop ring, any one of the plurality of exposure amount indications and the auto indication is selected by a code plate, which is fixed to the outer periphery of the lens barrel and forms a pattern by a combination of a conductive portion and a non-conductive portion, and a plurality of electrical contact points which respectively correspond to the plurality of indication areas and of which positions of contact with the code plate are changed in accordance with rotation of the stop ring.

11. A camera system comprising:
the lens unit according to claim 1; and
a camera body on which the lens unit can be interchangeably mounted.

* * * * *